US006831695B1

(12) United States Patent
Tamayama

(10) Patent No.: US 6,831,695 B1
(45) Date of Patent: Dec. 14, 2004

(54) IMAGE PICKUP APPARATUS FOR OUTPUTTING AN IMAGE SIGNAL REPRESENTATIVE OF AN OPTICAL IMAGE AND IMAGE PICKUP CONTROL METHOD THEREFOR

(75) Inventor: Hiroshi Tamayama, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 996 days.

(21) Appl. No.: 09/633,780

(22) Filed: Aug. 7, 2000

(30) Foreign Application Priority Data

Aug. 10, 1999 (JP) .......................................... 11-225962

(51) Int. Cl.$^7$ .............................................. H04N 5/235
(52) U.S. Cl. .................................. 348/362; 348/221.1
(58) Field of Search ............................ 348/221.1, 241, 348/248, 296, 297, 362, 363, 364, 365, 366, 367

(56) References Cited

U.S. PATENT DOCUMENTS

| 4,647,975 A | * | 3/1987 | Alston et al. ................ 348/362 |
| 5,638,120 A | * | 6/1997 | Mochizuki et al. .......... 348/296 |
| 5,969,761 A | * | 10/1999 | Takahashi et al. ........... 348/362 |
| 6,204,881 B1 | * | 3/2001 | Ikeda et al. .................. 348/362 |
| 6,219,097 B1 | * | 4/2001 | Kamishima et al. ......... 348/297 |
| 6,670,993 B1 | * | 12/2003 | Yamamoto et al. .......... 348/362 |
| 6,753,920 B1 | * | 6/2004 | Momose et al. ............. 348/364 |

FOREIGN PATENT DOCUMENTS

| JP | A6141229 | 5/1994 |
| JP | B2-797841 | 10/1995 |
| JP | B2-2755366 | 3/1998 |

OTHER PUBLICATIONS

K. Ishikawa et al, ITE Technical Report, "CCD image sensor with a 1/4 300,000 pixel configuration," vol. 20, No. 23, pp. 43–48 (Mar. 19, 1996), The ITE Technical Report is in Japanese language. There is no translation.

* cited by examiner

Primary Examiner—Ngoc-Yen Vu
Assistant Examiner—Luong T. Nguyen
(74) Attorney, Agent, or Firm—Birch, Stewart, Kolasch & Birch, LLP.

(57) ABSTRACT

An image pickup apparatus includes a shutter for intercepting light incident to the image sensor. A controller determines a first exposure value based on the incident light and a second exposure value that effects lower exposure than the first exposure value. The optical image is photoelectrically converted over an exposure time that consists of a first and a second period of time corresponding to the first and second exposure values, respectively. At the end of the exposure time, the shutter intercepts the incident light to thereby end the second period of time following the first period of time. After the image sensor has output the first signal corresponding to signal charges generated by the photosensitive cells during the first period of time, the image sensor outputs a second signal corresponding to signal charges generated by the photosensitive cells during the second period of time. An exposure amount ratio is calculated between the first and second signals. The level of the second signal is corrected in accordance with the exposure amount ratio. A combining circuit combines image signals, which respectively correspond to the first signal and the second signal corrected by the correcting circuit, for thereby outputting an image signal representative of a single frame picked up during the exposure time.

14 Claims, 13 Drawing Sheets

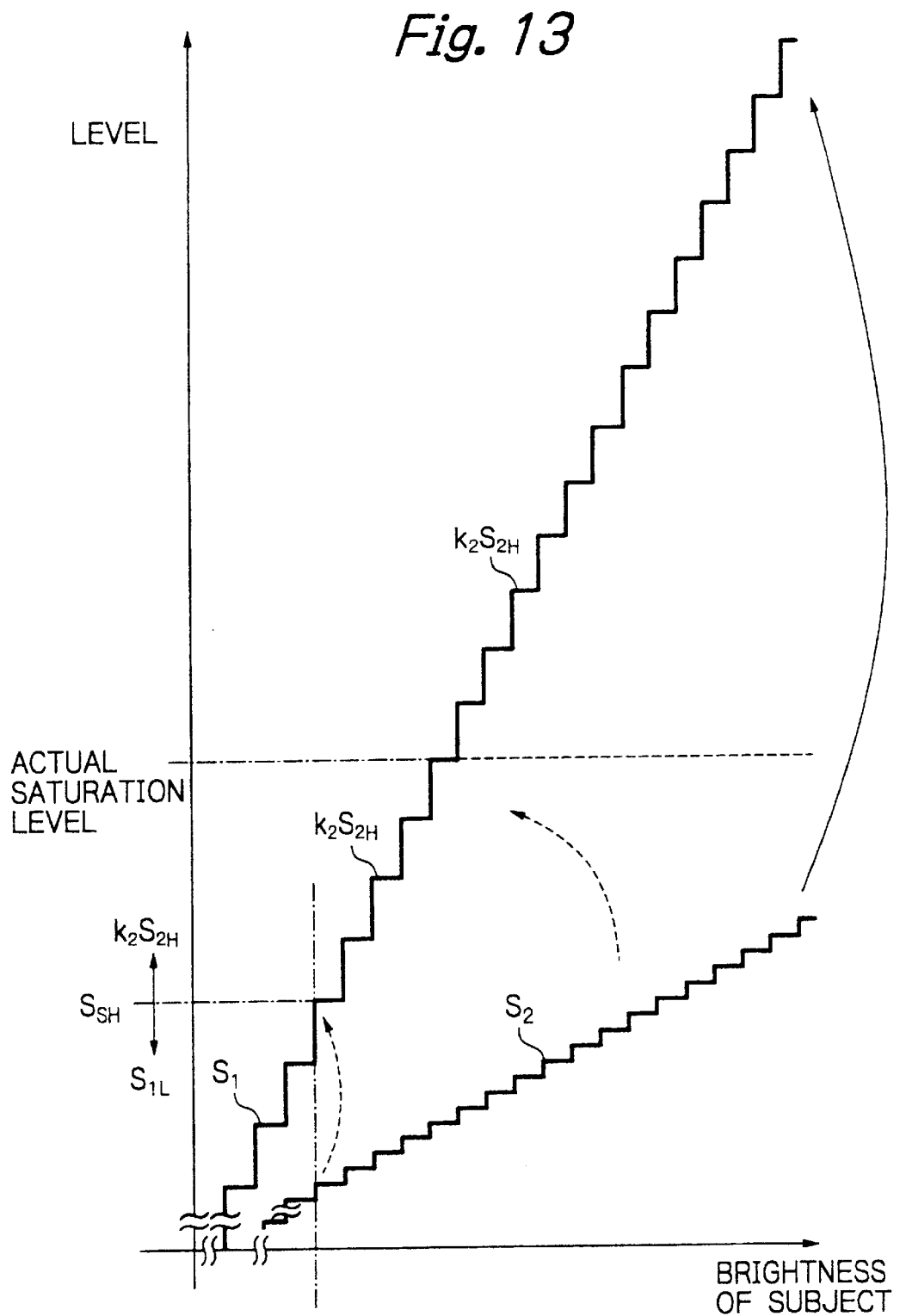

IMAGE PICKUP APPARATUS FOR OUTPUTTING AN IMAGE SIGNAL REPRESENTATIVE OF AN OPTICAL IMAGE AND IMAGE PICKUP CONTROL METHOD THEREFOR

BACKGROUND OF THE INVENTION

1. Field of the Invention

The present invention relates to an image pickup apparatus for photoelectrically converting an optical image focused to an image sensor to thereby output a corresponding image signal and an image pickup control method therefor. More particularly, the present invention relates to an image pickup apparatus capable of outputting, when taking a still picture, an image signal while broadening the dynamic range of an image sensor and an image pickup control method therefor.

2. Description of the Background Art

A digital camera extensively used today includes a solid-state image sensor implemented by CCD (Charge Coupled Device) charge transfer paths or MOS (Metal Oxide Semiconductor) devices. In the image sensor, photosensitive cells implemented by photodiodes photoelectrically transform incident light to corresponding signal charges. The signal charges are read out to generate digital image data representative of a scene picked up. To meet an increasing demand for high definition images, digital still cameras with 2,000,000 or more pixels have recently been put on the market. The photosensitive array of the image sensor is not increasing in size with an increase in the number of pixels, but is decreasing in order to, e.g., increase yield. This allows optics including a lens to be reduced in size and therefore contributes to the reduction of the overall size and weight of the camera.

In the image sensor of the kind having a high pixel density arranged therein, the area and capacity to be allocated to the individual photodiode must be reduced. It is therefore necessary to reduce noise ascribable to the image sensor, i.e., to increase the S/N (Signal-to-Noise) ratio and to realize a dynamic range broad enough to sufficiently reproduce low brightness to high brightness. However, a decrease in the area of the individual photodiode directly translates into a decease in a signal charge generated thereby. This, coupled with the fact that a signal charge to be stored in the individual photodiode decreases with a decrease in capacity, makes it difficult to noticeably broaden the dynamic range of the image sensor of the kind described.

A progressive scan, CCD image sensor with a ¼ 300,000 pixel configuration is disclosed in ITE Technical Report, Vol. 20, No. 23, pp. 43–48, Mar. 19, 1996 as a solution to the above-described problem. In accordance with this document, the maximum saturation charge of the image sensor is increased. Information identical with information stored in IT (Interline Transfer)-CCDs and information derived from a short exposure time are transferred to vertical transfer paths at the same time and then combined together by external circuitry.

Japanese patent laid-open publication No. 141229/1994 teaches an image pickup apparatus constructed to produce a composite image with a broad dynamic range by picking up two or more images different in charge storage time and combining them together. Japanese Patent No. 2755366 proposes an electronic camera capable of combining image data derived from a first exposure time and image data derived from a second exposure time longer than the first exposure time, thereby broadening the dynamic range of an image sensing array. Further, Japanese patent publication No. 97841/1995 discloses an image pickup apparatus constructed to select, out of signal levels of various portions of a plurality of frames that are different in the amount of exposure, portions having adequate levels and combining them together to output a composite image.

In any case, it has been customary to vary an exposure time determined by an electronic shutter function available with CCDs so as to pick up an image two times during a single field period. The resulting two images are combined in order to broaden the dynamic range.

However, a problem with the conventional technologies is that noticeable smears appear in an image signal derived from a high speed shutter although the dynamic range may be broadened. This, coupled with the fact that the image signal derived from a high speed shutter is increased in gain, degrades the combined image. More specifically, assume that while first pixel signals derived from a high speed shutter, which is opened only for a short period of time, are being transferred along vertical transfer paths, a second shot is effected over a period of time longer than the above period of time. Then, signal charges are caused to leak to the vertical transfer paths due to the second exposure and mixed with the first image signal, causing smears to appear in the first image signal. Smears are particularly conspicuous when a great amount of exposure is assigned to the second exposure.

Further, it is difficult to accurately combine two images because image signals are corrected in level in accordance with a ratio between the shutter open times and then combined. For example, to effect such consecutive exposure with a mechanical shutter and accurate shutter speeds, a highly accurate shutter opening and closing mechanism is required and must be provided with a sophisticated configuration for insuring stable operation. Such a shutter mechanism is therefore not feasible for a small size, light weight handy camera.

Moreover, even if exposure conditions for a shot are adequate, a scene to be shot sometimes includes a shadow portion and a highlight portion. In a highlight portion, in particular, the photodiodes of the image sensor are likely to saturate due to the brightness of a subject and the scatter of the image sensor itself. Therefore, simply combining two images is not successful to guarantee an attractive processed image.

SUMMARY OF THE INVENTION

It is therefore an object of the present invention to provide an image pickup apparatus capable of picking up a scene with a minimum of influence of smears and thereby producing an image signal with an adequately broadened dynamic range, and an image pickup control method therefor.

An image pickup apparatus of the present invention includes a shutter for intercepting, when an exposure time expires with photosensitive cells included in an image sensor generating signal charges, light incident to the image sensor. Image signals output from the image sensor are written to a memory. A controller determines an amount of exposure for picking up a scene in the form of a still picture. A combining circuit combines the image signals read out of the memory. The controller includes an exposure value determining circuit for determining a first exposure value based on the incident light and a second exposure value that effects lower exposure than the first exposure value. An exposure control circuit causes the optical image to be photoelectrically converted over the exposure time that consists of a first and a second period of time corresponding to the first and second exposure values, respectively. A first read control circuit causes, at a timing corresponding to the first period of time, signal charges generated by the photosensitive cells to be shifted to the transfer paths of the image sensor, thereby causing the image sensor to output a first signal corresponding to the signal charges. A light intercepting circuit causes, at the end of the exposure time, the shutter to intercept the incident light to thereby end the second period of time following the first period of time. A second read control circuit causes, after the image sensor has output the first signal, the image sensor to output a second signal corresponding to signal charges generated by the photosensitive cells during the second period of time. A ratio calculating circuit calculates an exposure amount ratio between the first and second signals. A correcting circuit corrects the level of the second signal in accordance with the exposure amount ratio. The combining circuit combines image signals, which respectively correspond to the first signal and the second signal corrected by the correcting circuit, for thereby outputting an image signal representative of a single frame picked up during the exposure time.

An image pickup control method of the present invention is applicable to the above image forming apparatus.

BRIEF DESCRIPTION OF THE DRAWINGS

The objects and features of the present invention will become more apparent from the consideration of the following detailed description taken in conjunction with the accompanying drawings in which:

FIG. 13 is a graph showing a relation between the brightness of a subject and the signal level of image data particular to the alternative embodiment shown in FIG. 12.

DESCRIPTION OF THE PREFERRED EMBODIMENTS

Figure 2:
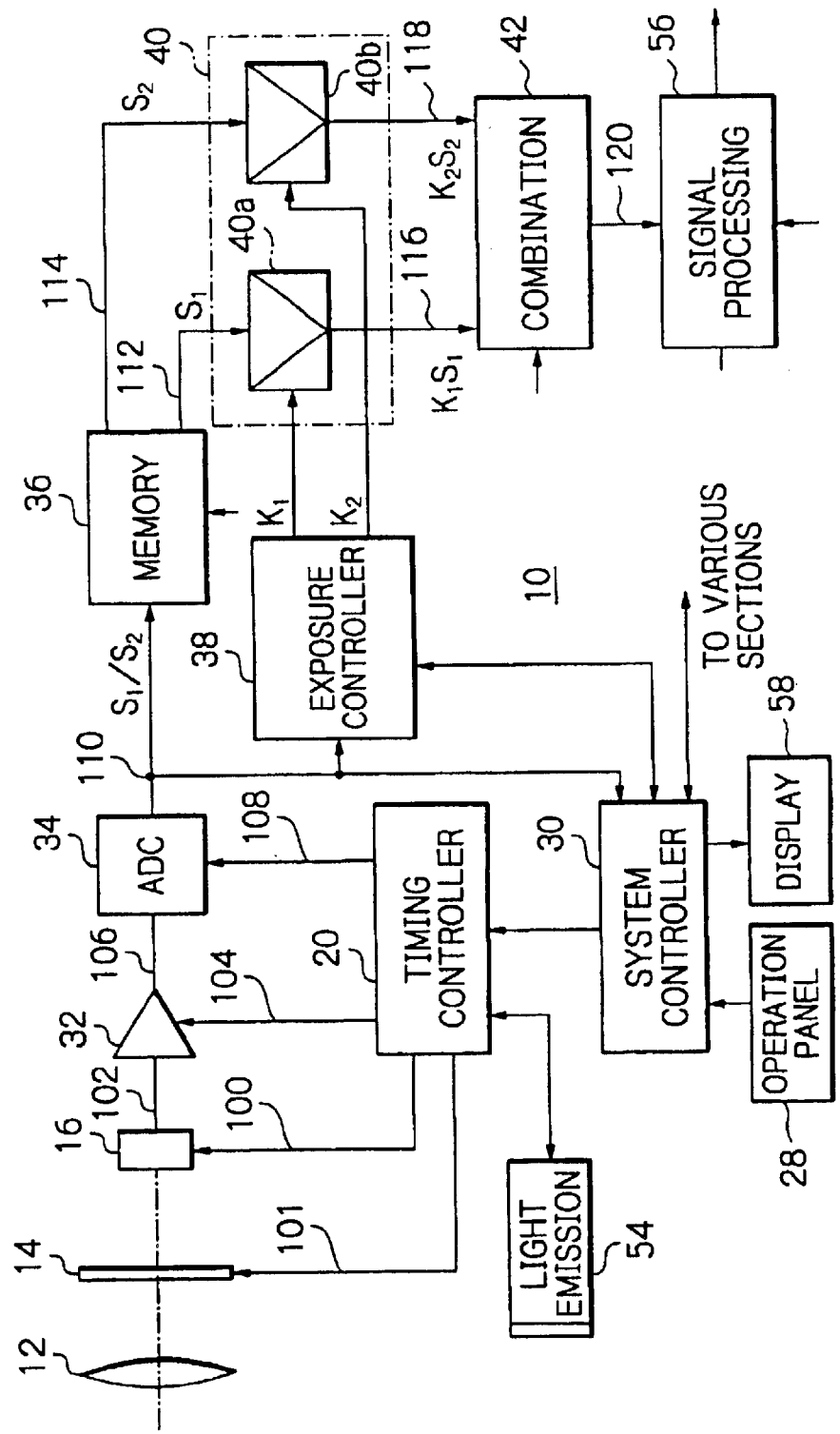
FIG. 2 is a block diagram schematically showing the digital still camera embodying the present invention.

Referring to FIG. 2 of the drawings, an image pickup apparatus embodying the present invention and implemented as digital still camera by way of example is shown and generally designated by the reference numeral 10. As shown, the digital still camera 10 picks up a scene focused to the photosensitive array of an image sensor 16 via a lens 12 and a mechanical shutter 14 and generates image data representative of the image of the scene. In the illustrative embodiment, the camera 10 drives the image sensor 16 by electronic shutter control and selectively opens and closes the mechanical shutter 14. By such exposure control, the camera 10 defines an exposure time T, as will be described specifically later.

The image sensor 16 outputs image signals corresponding to signal charges generates during the exposure times T and processes the image signals. Consequently, the image sensor 16 is capable of generating one frame of image signals with a dynamic range broader than its original dynamic range. It is to be noted that circuitry of the camera 10 not relevant to the understanding of the illustrative embodiment is not shown or described. Signals are designated by the references numerals attached to signal lines on which they appear.

Figure 3:
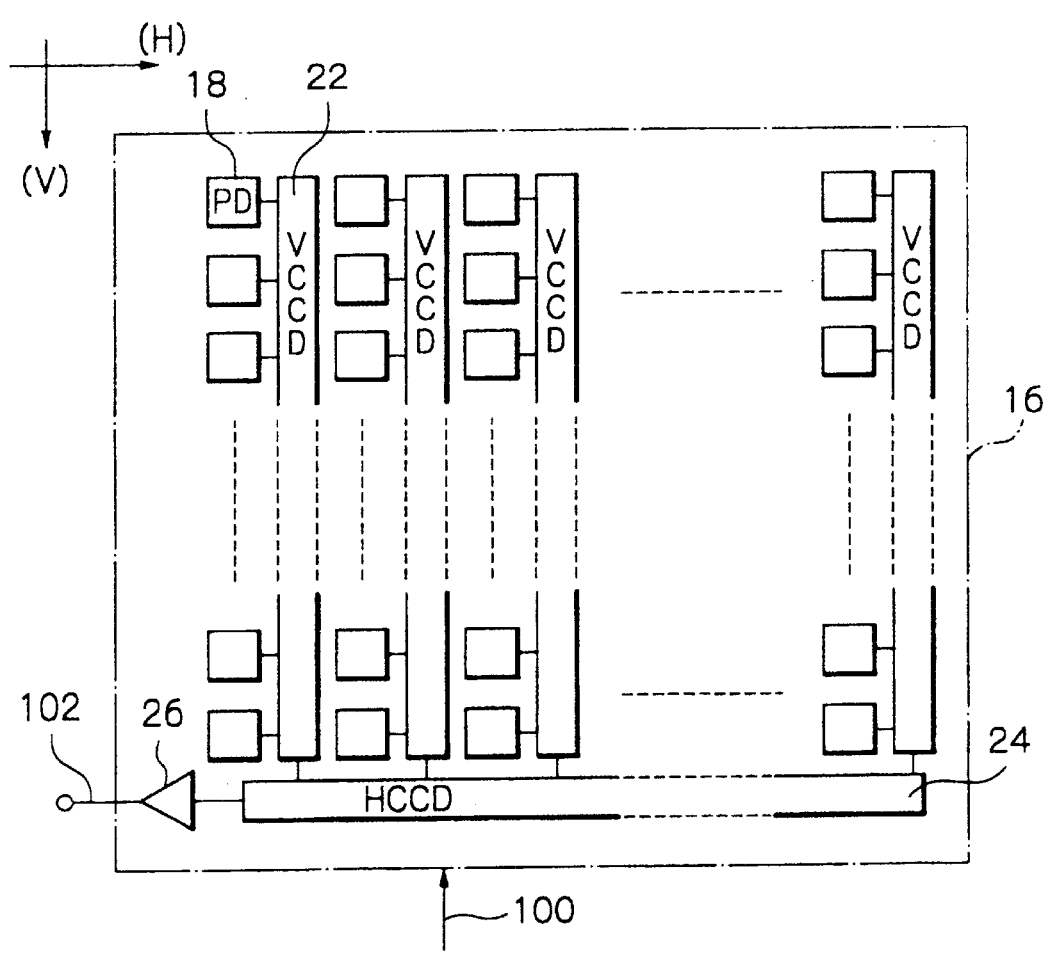
FIG. 3 is a schematic view showing a specific arrangement of an image sensor included in the illustrative embodiment.

The image sensor 16 is implemented by progressive scan, IT-CCDs (Interline Transfer CCDs) and has its photosensitive array covered with an RGB (red, green and blue) color filter, not shown, that uses primary colors. Specifically, as shown in FIG. 3, the image sensor 16 has photodiodes (PD), or photoelectric transducers, 18 bidimensionally arranged in the horizontal direction (H) and vertical direction (V). The PDs, or photosensitive cells, 18 form square pixels, and each generates a signal charge corresponding to a quantity of light incident thereto. As shown in FIG. 2, a timing controller 20 feeds to the image sensor 16 various drive signals 100 including field shift pulses and transfer pulses. As shown in FIG. 3, in synchronism with the drive signals, signal charges generated by the PDs 18 each are transferred to a particular vertical transfer path (VCCD) 22 adjoining the respective PD 18 and then transferred to a horizontal transfer path (HCCD) 24. Subsequently, the signal charges are sequentially delivered via an amplifier 26 in the form of corresponding image signals. The vertical and horizontal transfer paths 22 and 24 are implemented by CCDs.

Referring again to FIG. 2, the mechanical shutter 14 is an optical shutter that blocks, in response to a shutter pulse 101 also output from the timing controller 20, an optical path between the lens 12 and the image sensor 16 and thereby intercept incident light. In the illustrative embodiment, when the operator selects, e.g., a moving picture mode or presses a release button, not shown, provided on an operation panel 28 to a half-deep position, the shutter 14 opens in response to the shutter pulse 101. Subsequently, when the operator presses the release button to a full-deep position, the shutter 14 closes and thereby ends the exposure time T assigned to a desired single frame of still picture. Specifically, after the operator has pressed the release to the full-deep position in order to cause preselected adjustment for a shot to be executed, the exposure time T begins when the signal charges are fully swept out of the PDs 18, FIG. 3, and transfer paths 22 and 24. Signal charges generated and stored in the PDs 18 between the beginning and the end of the exposure time T form a single frame of image. The end of the exposure time T refers to the above-mentioned closing of the shutter 14.

Assume that the mechanical shutter 14 is located at the afocal point of the lens 12. Then, the shutter 14 may be provided with a variable opening, brightness limiting mechanism for adjusting the quantity of light to be incident to the image sensor 16. Alternatively, an iris diaphragm may be provided independently of the shutter 14 in order to control the amount of exposure in accordance with a photometric value.

An optical low-pass filter, not shown, is positioned in front of the image sensor 16. The optical low-pass filter causes an optical image with a limited spatial frequency to be focused to the image sensor 16 by, e.g., refracting an incident light beam in an irregular way.

The exposure time T and control over the drive of the image sensor 16 unique to the illustrative embodiment will be described with reference also made to FIG. 1. When the operator presses the release button to the half-deep position or selects the moving picture mode, a system controller 30 delivers a control signal representative of the operator's operation to the timing controller 20. In response, the timing controller generates drive signals for driving the image sensor 16 and thereby causes the image sensor 16 to sequentially output a plurality of continuous frames of image signals. At this instant, the timing controller 20 sends a shutter pulse to the mechanical shutter 14, causing the shutter 14 to remain open. Also, the timing controller 20 sends vertical and horizontal transfer pulses to the image sensor 16 at preselected intervals. In response, the image sensor 16 delivers signal charges stored in the PDs 18, i.e., pixel signals via the output 102.

The plurality of pixel signals output in the half-deep position of the release button, as stated above, are used to execute various kinds of adjustment before a shot, e.g., automatic focus adjustment, brightness control, and automatic white balance adjustment. Further, in a moving picture display mode, the pixel signals are processed to generate display data to be displayed on a monitor, not shown, so the frames of images can be displayed in the form of a moving picture. This implements an electronic viewfinder function.

Subsequently, when the operator presses the release button to the full-deep position, the system controller 30 sends a control signal representative of such a operator's operation to the timing controller 20. In response, the timing controller 20 generates drive signals for causing the image sensor 16 to output a plurality of frames of pixel signals over a preselected period of time. These pixel signals are used to execute adjustment for taking a still picture. An exposure controller 38 calculates an amount of exposure on the basis of the pixel signals representative of a scene to be shot and delivers it to the system controller 30. In response, the system controller 30 determines a shutter speed and a lens opening matching with the amount of exposure and sets them in the timing controller 20. The timing controller 20, in turn, generates drive signals for driving the image sensor 16 in accordance with the shutter speed. After such adjustment, the timing controller 20 feeds sweep pulses to the image sensor 16. In response, the image sensor 16 sweeps out charges existing in the PDs 18. Subsequently, the timing controller 20 stops outputting the sweep pulses and causes the exposure time T for a shot to start.

At the end of the exposure time T, the timing controller 20 feeds a shutter pulse to the mechanical shutter 14 for closing the shutter 14, thereby preventing light from the scene from being incident to the image sensor 16. The actual exposure time T ends when the shutter 16 fully closes on the elapse of a preselected operation delay α.

The timing controller 20 generates a first read pulse at a preselected point of the exposure time T so as to read out charges generated by the PDs 18. In response to the first read pulse, the image sensor 16 transfers charges from the PDs 18 to the corresponding vertical transfer paths 22 by field shift. In FIG. 1, this part of the exposure time T up to the generation of the first read pulse is represented by a period of time $T_1$. The above charges are transferred from the vertical transfer paths 222 to the horizontal transfer path 24 by transfer pulses fed from the timing controller 20. As a result, pixel signals are sequentially delivered via the amplifier 26 and output 102. Signal charges corresponding to incident light are continuously generated by the PDs 18 even after the period of time $T_1$. The other part of the exposure time T following the period of time $T_1$ is represented by a period of time $T_2$ and ends when the mechanical shutter 14 fully closes. The timing controller 20 outputs a second read pulse after a signal output period $S_1$ has expired. The second read pulse causes signal charges generated over the period of time $T_2$ to be transferred from the PDs 18 to the corresponding vertical transfer paths 22 by field shift and then to the horizontal transfer path 24. As a result, pixel signals are sequentially delivered via the amplifier 26 and output 102 over a signal output period $S_2$ following the signal output period $S_1$.

After all of the charges on the vertical and horizontal transfer paths 22 and 24 have been output over the signal output period $S_2$, the timing controller 20 opens the mechanical shutter 14 and restores the moving picture display mode. The timing controller 20 then resumes timing control and drive control assigned to the moving picture display mode, preparing the camera 10 for the next shot. If the moving picture mode is not selected, the timing controller 20 opens the shutter 14 when the operator presses the release button to the half-deep position.

More specifically, the period of time $T_1$ included in the exposure time T is determined by an adequate exposure value derived from a preselected AE (Automatic Exposure) algorithm on the basis of the image signal. However, the signal charges generated by the image sensor 16 sometimes saturate in part of the image signal, e.g., in the high brightness portion of the image signal. In light of this, the period of time $T_2$ is selected in accordance with an exposure value lower than the exposure value determining the period of time $T_1$ by several exposure value (EV), e.g., 2 to 3 EV or even 4 EV. The period of time $T_2$ is therefore shorter than the period of time $T_1$. Consequently, although signal charges are generated by the PDs 18 in part of the signal output period $S_1$, smears ascribable to such signal charges are prevented from noticeably influencing signal charges being transferred at that time.

Alternatively, the above periods of time $T_1$ and $T_2$ may be equal to each other if the lens opening is reduced when signal charges are generated during the period of time $T_2$ so as to reduce the quantity of light to be incident to the image sensor 16. Further, while the illustrative embodiment determines the period of time $T_1$ by automatic exposure adjustment, a period of time manually set by the operator on the operation panel 28 may be used as the period of time $T_1$. In such a case, too, the period of time $T_2$ should implement a smaller amount of exposure than the period of time $T_1$.

As stated above, in the illustrative embodiment, the period of time $T_1$ for electronic shutter control begins when signal charges are fully swept out of the image sensor 16. Signal charges generated over the period of time $T_1$ are read out within the exposure time T. The period of time $T_2$ following the period of time $T_1$ ends when the mechanical shutter 14 fully closes. Further, the period of time $T_2$ is shorter than the period of time $T_1$ and implements a smaller amount of exposure than the period of time $T_1$.

As shown in FIG. 2, a CDS (Correlated Double Sampling) circuit 32 is connected to the output 102 of the image sensor 16. The CDS circuit 32 executes CDS with the pixel signals 102 so as to reduce reset noise in response to sampling pulses and reset pulses 104 fed from the timing controller 20. Sampled pixel signals 106 output from the CDS circuit 32 are input to an analog-to-digital converter (ADC) 34. The ADC 34 converts the input pixel signals 106 to digital image signals or image data. The timing controller 20 feeds a pixel clock to the input 108 of the ADC 34. In the illustrative embodiment, the ADC 34 converts the pixel signals 106 to digital image signals with ten-bit accuracy in accordance with the pixel clock. The ADC 34 has an output 110 connected to a memory 36 and the previously mentioned exposure controller 38.

The digital image signals (image data hereinafter) output from the ADC 34 are written to the memory 36 via the input 110 of the memory 36. In the illustrative embodiment, the memory 36 is implemented as a frame memory capable of accommodating one frame of image data output over the signal output periods $S_1$ and $S_2$ of the image sensor 16. The image data ($S_1$) written to the memory 36 during the signal output period $S_1$ are read out and fed to an output 112. The other image data ($S_2$) written to the memory 36 during the signal output period $S_2$ are read out and fed to an output 114. The outputs 112 and 114 of the memory 36 are respectively connected to level correcting circuits 40a and 40b that constitute a level correcting section 40 in combination.

The level correcting section 40 corrects the signal level of the image data ($S_1$) 112 stored during the signal output period $S_1$ and the signal level of the image data ($S_2$) 114 stored during the signal output period $S_2$. Specifically, the exposure controller 38 delivers correction signals $k_1$ and $k_2$ to the level correcting circuits 40a and 40b, respectively. The level correcting section 40 corrects the digital values of the image data ($S_1$) and ($S_2$) with the correction signals $k_1$ and $k_2$, respectively. More specifically, the level correcting circuit 40a multiplies the image data ($S_1$) 112 by the correction signal $k_1$ and produces the resulting product ($K_1*S_1$) on its output 116. Likewise, the level correcting circuit 40b multiplies the image data ($S_2$) 114 by the correction signal $k_2$ and produces the resulting product ($K_2*S_2$) on its output 118. The outputs 116 and 118 of the level correcting circuits 40a and 40b both are connected to a combination 42.

Figure 4:
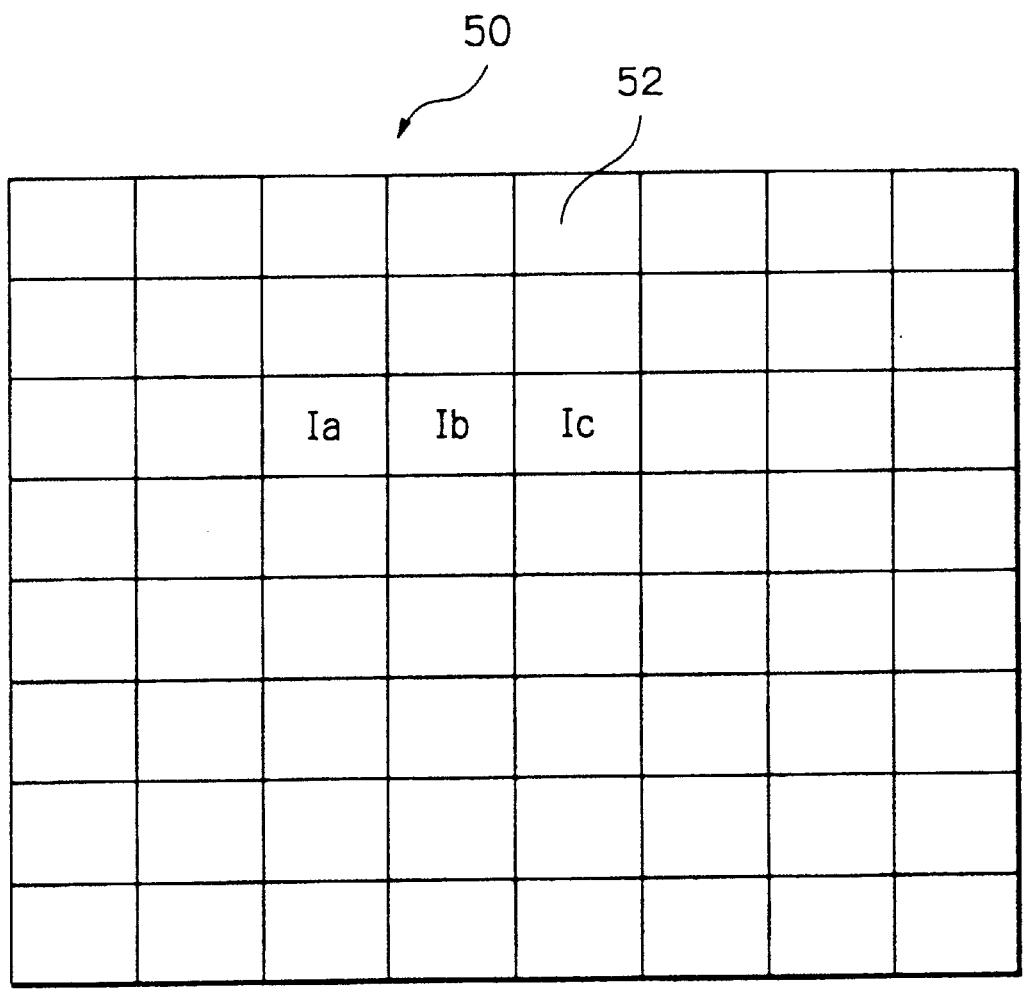
FIG. 4 is a view showing a frame divided into a plurality of blocks.

The exposure controller 38 determines the brightness of a scene on the basis of the image data 110 being picked up over a display period in the moving picture display mode and an adjustment period $T_0$ (see FIG. 1) preceding an actual shot. Specifically, as shown in FIG. 4, the exposure control 38 divides a frame 50 into 8 (vertical)×8 (horizontal) blocks 52, i.e., sixty-four blocks 52 in total. The exposure control 38 calculates, based on the image data of each block 52, a photometric value for controlling brightness in the moving picture mode or for taking a still picture by adequate exposure.

For example, when the operator selects an estimation photometry mode, the exposure controller 38 selects a plurality of blocks 52 as photometry areas. The exposure controller 38 then adds up the signal levels of each photometry area that are representative of brightness, and weights the resulting area-by-area sums, thereby determining a photometric value corresponding to the image data. The exposure control 38 determines, based on the determined photometric value, a lens opening and a shutter speed for controlling the quantity of light in accordance with a lens opening priority AE mode, program AE mode or similar AE mode. Subsequently, the exposure control 38 sends to the system controller 30 control information representative of the periods of time $T_1$ and $T_2$ defining the exposure time T.

Further, the exposure controller 38 receives the image data ($S_1$) and ($S_2$) representative of a still picture to be respectively written to the memory 36 over the signal output periods $S_1$ and $S_2$ of the image sensor 16. The exposure control 38 produces, based on the image data ($S_1$) and ($S_2$), an actual exposure amount ratio m for correcting the signal levels of the image data ($S_1$) and ($S_2$). Stated another way, the exposure controller 38 determines an actual exposure amount ratio m without resorting to the information representative of the periods of time $T_1$ and $T_2$. It is therefore possible to calculate an accurate exposure amount ratio m even if the operation time of the mechanical shutter 14 is irregular. This obviates the need for an extra mechanism for enhancing the accuracy of the shutter 14.

Figure 5:
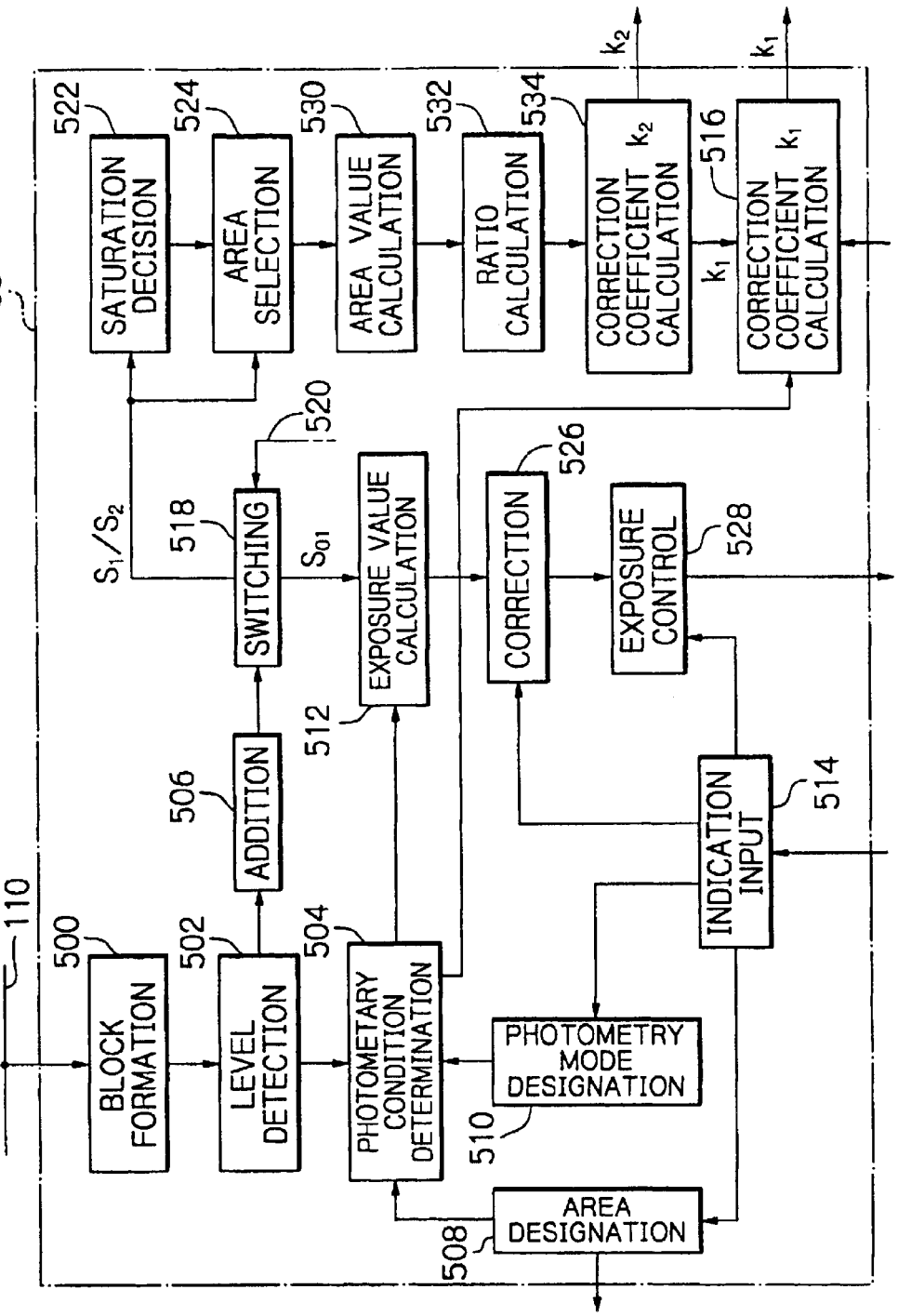
FIG. 5 is a schematic block diagram showing a specific configuration of an exposure controller included in the illustrative embodiment.

FIG. 5 shows a specific configuration of the exposure controller 38. As shown, the exposure controller 38 includes a block formation 500 connected to the output 110 of the ADC 34. The block formation 500 divides the frame 50, FIG. 4, into the blocks 52 and generates image data block by block. A level detection 502 detects signals levels represented by the block-by-block image data output from the block formation 500. The level detection 502 then delivers the timings of the detected blocks to a photometry condition determination 504 and delivers the values of the block-by-block image data to an addition 506.

The photometry condition determination 504 receives area information from an area designation 508 and receives photometry mode information from a photometry mode designation 510. The determination 504 generates, based on the input information, block selection information for calculating an exposure value with the blocks subject to photometry. Also, the determination 504 generates weight information for causing the subject blocks to be weighted. The block selection information and weight information are delivered to an exposure value calculation 512.

Photometry area information is input to the area designation 508 via an indication input 514. The area designation 508 generates area information representative of the blocks indicated by the photometry area information and feeds it to the photometry condition determination 504. Alternatively, the area designation 508 may generate area information corresponding to a focusing area determined by the system controller 30 and thereby designate an area corresponding to a range finding area.

Photometry mode information is fed to the photometry mode designation 510 via the indication input 514. The photometry mode designation 510 generates, based on the input information, information indicative of whether the photometry mode is an estimation photometry mode, a mean photometry mode or a spot photometry mode and delivers the information to the photometry condition determination 504. The photometry condition determination 504 generates, in accordance with the input information, information for weighting each block designated by the area information. Further, the determination 504 makes, based on the block-by-block image data received from the level detection 502, a decision for making the sums of the block-by-block levels derived from a scene optimal for a picture to be taken.

For example, taking account of block-by-block brightness levels, color information and contrast, the photometry condition determination 504 selects blocks to be used for photometry in accordance with a pattern or increases or decreases the estimation weights of the blocks selected. In this manner, the determination 504 determines photometry conditions that make the sum of the block-by-block levels optimal for a picture to be taken. Further, the determination 504 delivers level optimization information representative of the photometry conditions to a correction coefficient $k_1$ calculation 516.

An addition 506 is connected to the output of the level detection 502. The addition 506 sums up the respective values of R, G and B color image data in each block and delivers the resulting block-by-block sums to a switching 518 color by color. Operation mode information is input to the switching 518 via a control input 520. In the moving picture mode and during the adjustment period T0, the operation mode information causes the switching 518 to connect the output of the addition 506 to an exposure value calculation 512. Consequently, the block-by-block sums output from the addition 506 are transferred to the exposure value calculation 512 via the switching 518. During the exposure time T following the adjustment period $T_0$, the operation mode information causes the switching 518 to connect the output of the addition 506 to a saturation decision 522 and an area selection 524. In this condition, the block-by-block sums are delivered from the addition 518 to the saturation decision 522 and area selection 524.

The exposure value calculation 512 determines an exposure value (EV) optimal for a still picture representative of a scene in accordance with the block selection information and weight information received from the photometry condition determination 504. Specifically, the calculation 512 multiplies the sums of the blocks designated by the block selection information by the weight information so as to produce an exposure value matching with the photometry mode and photometry area. The output of the calculation 512 is connected to a correction 526. The correction 526 increases or decreases the calculated exposure value in accordance with correction information input via the indication input 514. The corrected exposure value is fed from the correction 526 to an exposure control 528.

In response to AE mode information received via the indication input 514, the exposure control 528 determines a period of time $T_1$ corresponding to the corrected exposure value and a period of time $T_2$ corresponding to an exposure value smaller than the corrected exposure value by several exposure value. These periods of time $T_1$ and $T_2$ determine the overall exposure time T of the image sensor 16 for a single still picture. In this manner, the exposure control 528 extends the exposure time by the extra period of time $T_2$, i.e., adds the period of time $T_2$ to the period of time $T_1$ that corresponds to the adequate exposure value. This allows the image sensor 16 to generate signal charges within the sequence of image pickup periods.

For example, assume that the highlight portion of an image to be picked up by adequate exposure, which is determined by estimation photometry, includes a high brightness portion reached the saturation level of the PDs 18. Then, the exposure control 528 sets a period of time $T_2$ that is, e.g., one-half of the period of time $T_1$ or less and corresponds to negative correction by 1 EV to several exposure value. Such a period of time $T_2$ successfully provides the high brightness portion with further tonality. The exposure control 528 delivers the periods of time $T_1$ and $T_2$ and exposure control information representative of the lens opening to the system controller 30, FIG. 2. If desired, the exposure control 528 may determine a lens opening in accordance with the AE mode to thereby control the amount of exposure of the image sensor 16 and determine, e.g., the quantity and the duration of light to issue from a light emission 54 (see FIG. 2), as needed. In such a case, the exposure control 528 will send light emission control information to the control system 30.

The indication input 514 transfers control information corresponding to control signals, which are fed from the system controller 30, to the various sections of the exposure controller 38. Specifically, the indication input 514 transfers the photometry area information to the area designation 508, transfers the photometry mode information to the photometry mode designation 510, and transfers the correction information to the correction 526, as stated earlier. In addition, the indication input 514 transfers the AE mode to the exposure control 528.

The saturation decision 522 connected to the other output of the switching 518 determines, based on the block-by-block sums, whether or not any one of the blocks has reached the saturation level of the image sensor 16. The saturation level is selected to be lower than one assumed in the design aspect in consideration of the scatter of the actual saturation level of the image sensor 16. On detecting a block reached the saturation level, the saturation decision 522 delivers saturation information relating to the block to the area selection 524.

The area selection 524 selects, based on the above saturation information, the sums of normal blocks not reached the saturation level, i.e., non-saturated blocks and feeds the block-by-block sums selected to an area value calculation 530.

The area value calculation 530 totals the sums of the normal blocks. Specifically, the calculation 530 totals each of the pixel signals ($S_1$) and pixel signals ($S_2$) generated by and output from the image sensor 16 during the periods of time $T_1$ and $T_2$, respectively. More specifically, the calculation 530 produces period-by-period totals $\Sigma S1$ and $\Sigma S2$ of the sums of non-saturated blocks (Ia+Ib+Ic+ . . . ) exposed during the periods of time $T_1$ and $T_2$. The resulting period-by-period totals $\Sigma$ S1(I1a+I1b+I1c . . . ) and $\Sigma$ S2(I2a+I2b+I2c . . . ) are input to a ratio calculation 532. The ratio calculation 532 produces a ratio m between the totals $\Sigma$ S1 and $\Sigma$ S2. The area value calculation 530 and ratio calculation 532 guarantee linearity when the image signals $S_1$ and $S_2$ are combined, as will be described specifically later.

A correction coefficient $k_2$ calculation 534 is connected to the output of the ratio calculation 532. The correction coefficient $k_2$ calculation 534 calculates a correction coefficient $k_2$ on the basis of the correction coefficient $k_1$ and ratio m fed from the correction coefficient $k_1$ calculation 516 and the ratio calculation 532, respectively. Specifically, in the illustrative embodiment, the calculation 534 multiplies the ratio m by the correction coefficient $k_1$ and delivers the resulting correction coefficient $k_2$ (=m×$k_1$) to the level correction 40b, FIG. 2.

The correction coefficient $k_1$ calculation 516 is connected to the output of the photometry condition determination 504. The calculation 516 determines the correction coefficient $k_1$ on the basis of the previously mentioned level optimization information output from the determination 504 at the time of photometry. The correction coefficient $k_1$ is fed from the calculation 516 to the correction coefficient $k_2$ calculation 534 and level correction 40a, FIG. 2.

In the illustrative embodiment, the addition 506 performs addition with each of the R, G and B signals derived from the arrangement of the RGB color filter associated with the image sensor 16. The saturation decision 522 executes decision on saturation color by color. Consequently, a ratio between the sums of each non-saturated block is calculated for each of the primary colors R, G and B. The correction coefficient k2 calculation 534 multiplies color-by-color ratios $m_R$, $M_G$ and $m_B$ by color-by-color correction coefficients $k_{1R}$, $k_{1G}$ and $k_{1B}$, respectively, output from the correction coefficient k1 calculation 516, thereby producing color-by-color correction coefficients $k_{2R}$, $k_{2G}$ and $k_{2B}$.

Figure 6:
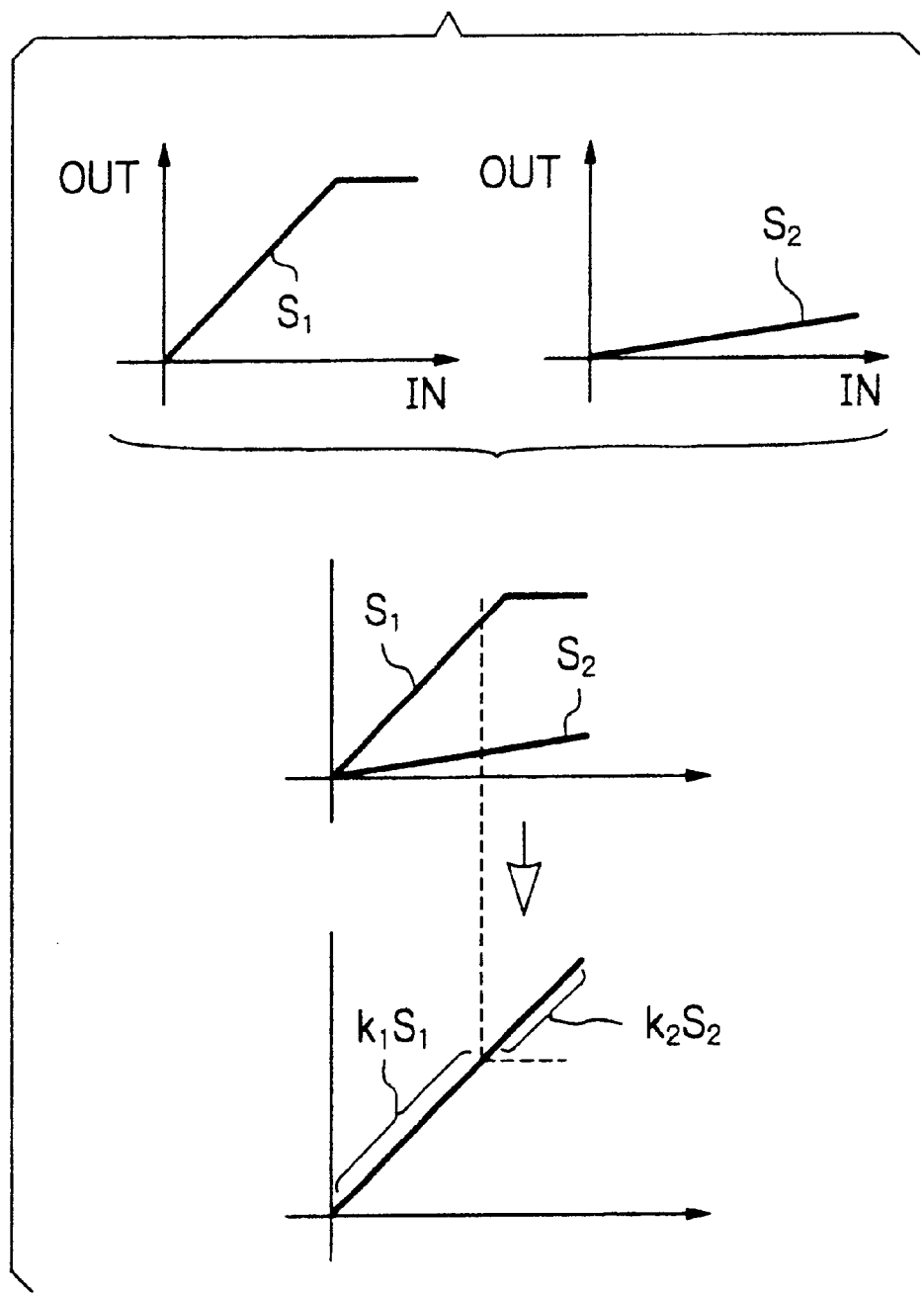
FIG. 6 is a chart showing how the illustrative embodiment combines image data.

Referring again to FIG. 2, the combination 42 combines the image data ($S_1$) and image data ($S_2$) respectively output during the signal output periods $S_1$ and $S_2$ of the image sensor 16. In the illustrative embodiment, the combination 42 interpolates values obtained from the pixel data ($S_2$) in the levels of the pixel data ($S_1$) higher than the saturation level. More specifically, as shown in FIG. 6, the combination 42 combines pixel data ($k_1S_1$) and ($k_2S_2$) produced by multiplying the pixel data ($S_1$) and ($S_2$) by the coefficients $k_1$ and $k_2$, respectively. The pixel data ($k_1S_1$) are lower than a preselected saturation level while the pixel data ($k_2S_2$) are higher than the saturation level.

Figure 7:
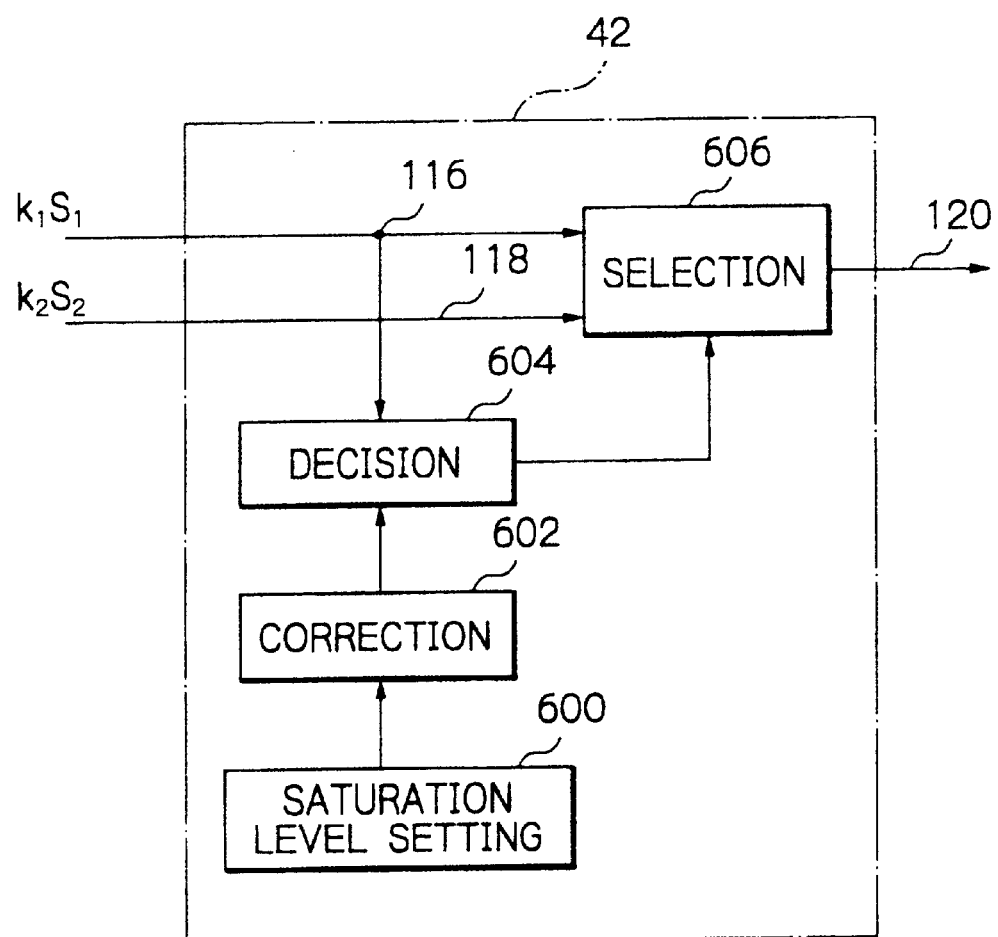
FIG. 7 is a schematic block diagram showing a specific configuration of a combining section included in the illustrative embodiment.

FIG. 7 shows a specific configuration of the combination 42. As shown, the combination 42 includes a saturation level setting 600 for setting the reference saturation level of the image sensor 16. A correction 602 lowers the reference saturation level set by the setting 600 by a preselected value in consideration of the scatter of the saturation level of the image sensor 16. A decision 604 compares the corrected saturation level and the value of the pixel data ($S_1$) 116 appearing on an input 116 and thereby determines whether or not the latter has exceeded the former. A selection 606 selects either one of the image data ($S_1$) and ($S_2$) in accordance with the output of the decision 604 and outputs it via an output 120. In this manner, the combination 42 not only combines pixel data, but also selects image data on the basis of the signal level. This is successful to produce output signals of adequate levels short of the saturation level.

The level correcting circuit 40a multiplies the color components of the R, G and B pixel signals output over the signal output period $S_1$ by $k_{1R}$, $k_{1G}$ and $k_{1B}$, respectively, to thereby produce pixel data ($k_{1R}S_1$), ($k_{1G}S_1$) and ($k_{1B}S_1$). Likewise, the level correcting circuit 40b multiplies the color components of the R, G and B pixel signals output over the signal output period $S_2$ by $mk_{1R}$, $mk_{1G}$ and $mk_{1B}$ ($mk_1=k_2$), respectively, to thereby produce pixel data ($k_{2R}S_2$), ($k_{2G}S_2$) and ($k_{2B}S_2$). The combination 42 combines the pixel data ($k_{1R}S_1$), ($k_{1G}S_1$) and ($k_{1B}S_1$) and pixel data ($k_{2R}S_2$), ($k_{2G}S_2$) and ($k_{2B}S_2$) color by color. The combination 42 therefore executes combination and white balance adjustment at the same time on the basis of information derived from the non-saturated pixel blocks.

The combination 42 has an output 120 connected to a signal processing 56. The signal processing executes various kinds of digital signal processing including gamma correction, edge correction, luminance and chrominance (YC) conversion and compression coding with the image data output from the combination 42. The processed image data are written to a memory card or similar data recording medium including, e.g., a semiconductor memory.

The system controller 30 governing the entire camera 10 includes a CPU (Central Processing Unit) and peripheral circuits although not shown specifically. The system controller 30 sets the operation mode of the camera 10 in accordance with information input via the operation panel 28 and executes particular control and processing matching with each operation mode. Further, the system controller 30 sends to the timing controller 20 a release signal based on the operator's operation of the release button that is provided on the operation panel 28.

For example, the system controller 30 determines a photometry mode, a photometry area, exposure correction and AE mode in accordance with the operator's operation of the operation panel 28. The system controller 30 then generates control information indicative of such conditions and delivers the control information to the exposure control 38. Also, the system controller 30 sends to the timing controller 20 a control signal matching with exposure control information, including an exposure time ($T_1$ and $T_2$) and a lens opening, received from the exposure control 38.

Further, the system controller 30 picks up a contrast component lying in a preselected focusing area out of the image data and controls the focal point of the lens 12 in accordance with the contrast component (contrast sensing type of automatic focus adjusting function). For example, the system controller 30 receives the image data generated during the adjustment period T0 from the ADC 34 and produces control information for controlling the lens 12 to a focal point where the contact of the scene is highest. A lens driver, not shown, drives the lens 12 to the above focal point in accordance with the control information. The control panel 28 connected to the system controller 30 includes a power switch, a mode dial and other various buttons in addition to the release button and switch circuits associated therewith. The control panel 28 reports the system controller 30 of the operator's manipulation of the control panel 28.

Moreover, the system controller 30 causes a display 58 to display the operation statuses of the camera 10. For example, the controller 30 causes the display 58 to show the operator an operation mode selected, the number of shots available and an alarm relating to the brightness of a scene on an LCD panel included in the display 58. Watching the display 58, the operator is capable of varying various kinds of setting, as desired. In addition, the system controller 30 sets parameters, including a compression ratio, with which the signal processing 56 executes signal processing.

A specific operation of the illustrative embodiment will be described hereinafter with reference to FIG. 1. Assume that the operator selects the moving picture display mode on the mode dial. Then, at a time $t_0$, FIG. 1, the mechanical shutter 16 is opened in response to the first shutter pulse. At the same time, the image sensor 16 is driven to output frame-by-frame pixel signals over a signal output period $S_{00}$. The frame-by-frame pixel signals are subjected to CDS and digitization. The resulting digital image data are subjected to various kinds of signal processing including brightness adjustment and focus adjustment (pickup adjustment for a moving picture).

At a time $t_1$, when the operator presses the release button to the full-deep position, signal charges stored in the PDs 18 are swept out in response to the sweep pulses over a period of time $T_0$. At a time $t_2$ when the period of time $T_0$ expires, signal charges generated by and stored in the PDs 18 are read out over a signal output period $S_{01}$. As a result, a plurality of frames of pixel signals are output from the image sensor 16. Pickup adjustment for a still picture is executed on the basis of the pixel signals. After the pickup adjustment, needless charges are swept out of the PDs 18 from a time $t_3$ to a time $t_4$. At the time $t_4$, the period of time $T_1$ forming part of the exposure time T begins.

At a time $t_5$, a read pulse is generated in order to shift signal charges stored in the PDs 18 during the period of time $T_1$ to the vertical transfer paths by field shift. The signal charges are then transferred to the horizontal transfer path and output from the image sensor 16 as pixel signals ($S_1$) appeared during the period of time $T_1$.

The PDs 18 continuously generate signal charges over the period of time $T_2$ that begins at the time $t_5$. These signal charges are shifted in response to a read pulse generated after the signal output period $S_1$ and then output from the image sensor 16 as pixel signals ($S_2$) over the signal output period $S_2$. At a time $t_6$, the mechanical shutter 14 closes in response to a shutter pulse with the result that the PDs 18 are fully screened at a time $t_7$ on the elapse of the operation delay time α. The pixel signals ($S_1$) representative of a single frame are fully output from the image sensor 16 at a time $t_8$. Subsequently, at a time $t_9$, a read pulse for shifting signal charges stored in the PDs 18 is sent to the image sensor 16. Consequently, the signal charges are output from the image sensor 16 over the signal output period $S_2$ as pixel signals ($S_2$).

The pixel signals output from the image sensor 16 over each of the signal output periods $S_1$ and $S_2$ are subjected to CDS and then input to the ADC 34. The ADC 34 converts the input pixel signals to corresponding digital signals or image data and delivers the image data to the memory 36 and exposure controller 38.

In the exposure controller 38, the block formation 500 divides the input image data into blocks of data and feeds the blocks of data to the level detection 502. The photometry condition determination 504 sets photometry conditions matching with the designated photometry mode and area information in accordance with the signal levels received from the level detection 502. The determination 504 then delivers block selection information and weight information corresponding to the photometry conditions to the exposure value calculation 512. The addition 506 selects the detected signal levels block by block and produces a sum thereof block by block. The block-by-block sums are input to the switching 518. Up to the time $t_3$, FIG. 1, the switching 518 transfers the sums to the exposure value calculation 512 in accordance with operation mode information input to its control input 520.

The exposure value calculation 512 selects those of the input block-by-block sums that match with the photometry conditions received from the photometry condition determination 504. The calculation 512 then weights the sums selected and then calculates an exposure value corresponding to the weighted sums. The correction 526 corrects the exposure value output from the calculation 512 in accordance with a correction command. The corrected exposure value is fed from the correction 526 to the exposure control 528.

The exposure control 528 determines an exposure time T ($T_1$ and $T_2$) and a lens opening on the basis of the exposure value and AE mode and sends them to the system controller 30. In response, the system controller 30 delivers a control signal matching with the exposure value to the timing controller 20, causing the timing controller 20 to determine periods of time $T_1$ and $T_2$ based on the image divided into sixty-four blocks. Then, at the time $t_3$, needless signal charges begin to be swept out of the PDs 18. This is followed by the period of time $T_1$ forming part of the exposure time T, as stated earlier.

On the elapse of the period of time $T_1$, the timing controller 20 feeds a read pulse to the image sensor 16. In response, signal charges existing in the PDs 18 are transferred to the vertical transfer paths 24 and then to the horizontal transfer path 24. The signal charges on the horizontal transfer path 24 are sequentially fed out via the output amplifier 26 as pixel signals ($S_1$). Even during the period of time $T_2$ forming the other part of the exposure time T, the PDs 18 continuously generate and store signal charges representative incident light. At the time $t_6$, another shutter pulse is generated to close the mechanical shutter 14. At the time $t_7$ when the shutter 14 fully closes, the period of time $T_2$ expires. The signal output period $S_1$ continues over the period of time $T_2$. At the time $t_8$, the transfer of the signal charges complete, i.e., the entire pixel signals representative of a single frame are output.

At the time $t_9$, another read pulse is fed to the image sensor 16. In response, the image sensor 16 again shifts signal charges continuously generated in the PDs 18 to the vertical transfer paths 22 and feeds them out as pixel signals ($S_2$) via the horizontal transfer path 24 and output amplifier 26.

The pixel signals ($S_1$) and ($S_2$) output from the image sensor 16 each are subjected to CDS and then input to the ADC 34. The ADC 34 converts the pixel signals ($S_1$) and ($S_2$) appeared over the exposure time T to corresponding digital image data. The memory 36 writes each of the image data ($S_1$) and ($S_2$) input during the signal output periods $S_1$ and $S_2$, respectively, in a particular area thereof. The image data ($S_1$) and ($S_2$) are respectively read out of the memory 36 via the outputs 112 and 114 in response to a read enable signal received from the system controller 30.

The above pixel data ($S_1$) and ($S_2$) output from the ADC 34 are input to the exposure controller 38 as well as to the memory 36. In the exposure controller 38, the block formation 500 divides the image data input over the signal output period $S_1$ into blocks of data. The level detection 502 detects signal levels block by block. The addition 506 adds the signal levels of each block and delivers the resulting block-by-block sums to the saturation decision 522 and area selection 524 via the switching 518.

The saturation decision 522 determines whether or not the individual block has saturated on the basis of the sum of the block derived from the image data ($S_1$). The results of such block-by-block decision are fed from the saturation decision 522 to the area selection 524. The area selection 524 selects, based on the results of decision input from the saturation decision 522, the sums of the non-saturated blocks and feeds them to the area value calculation 530. In the same manner, the area selection 524 selects, based on the results of decision input from the saturation decision 522, the sums of the non-saturated blocks derived from the pixel signals ($S_2$) appeared over the signal output period $S_2$. These sums are also input to the area value calculation 530. Consequently, the sums of, among the image data generated during the signal output periods $S_1$ and $S_2$, the image data ($S_1$) and ($S_2$) existing in the non-saturated blocks are fed to the area calculation 530.

The area calculation 530 totals the input sums for each of the signal output periods $S_1$ and $S_2$ to thereby produce two area values particular to the area selected. The ratio calculation 532 calculates a ratio m between the two area values and delivers the ratio m to the correction coefficient $k_2$ calculation 534.

Figure 10:
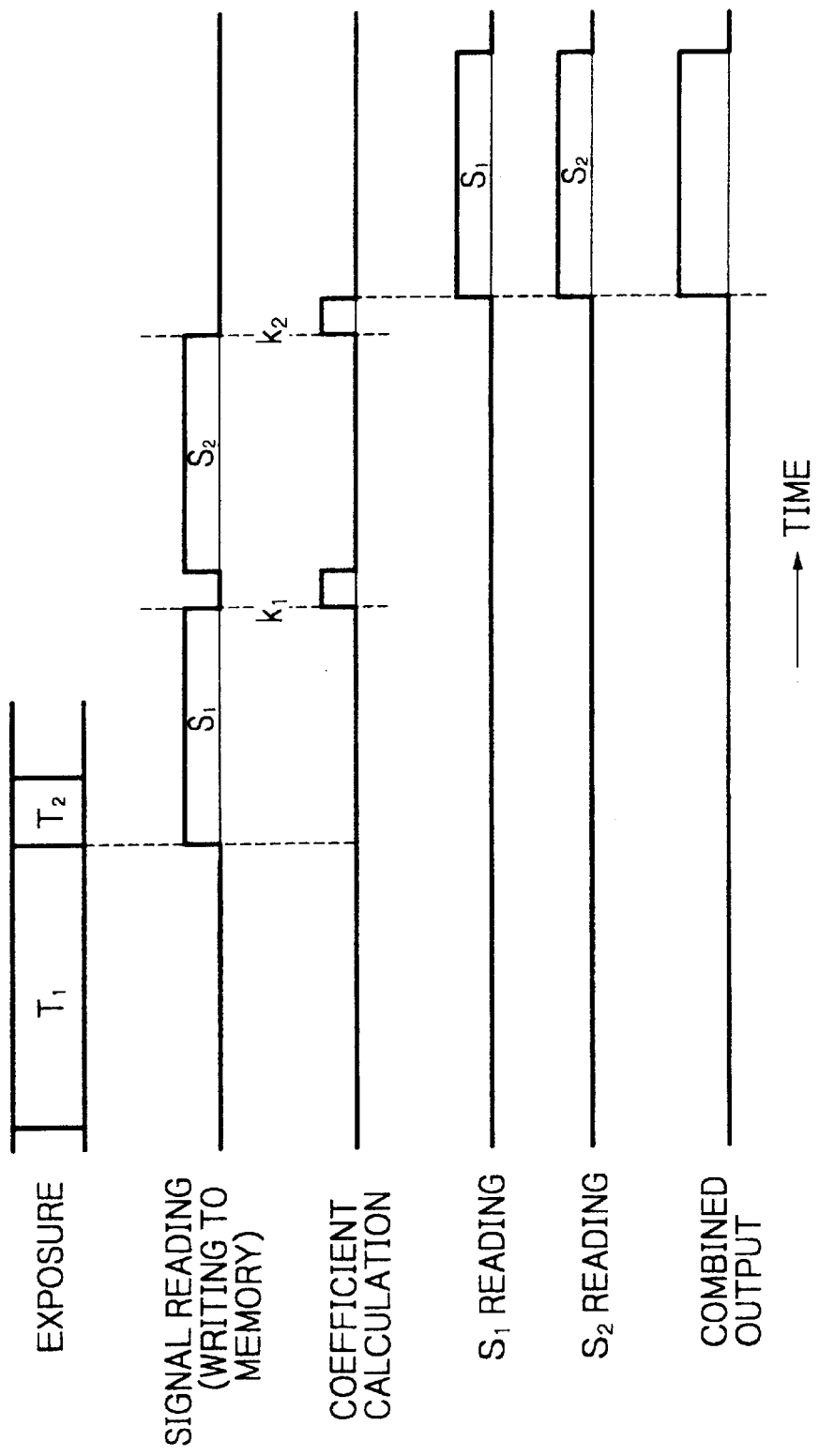
FIG. 10 is a timing chart demonstrating how the illustrative embodiment calculates correction coefficients and combines image data.

On the other hand, as shown in FIG. 10, the correction coefficient $k_1$ calculation 516 calculates a correction coefficient $k_1$ in accordance with the level optimization information fed from the photometry condition determination 504. The correction coefficient $k_1$ is input to the level correcting circuit 40a. The correction coefficient $k_2$ calculation 534 multiplies the correction coefficient $k_1$ by the ratio m and delivers the resulting product $k_1*m(=k_2)$ to the level correcting circuit 40b as a correction coefficient $k_2$.

The image data ($S_1$) and ($S_2$) written to the memory 36 are read thereoutof at the same timing, as shown in FIG. 10. The level correcting circuits 40a and 40b, constituting the level correcting section 40, respectively multiply the input image data ($S_1$) and ($S_2$) by the correction coefficients $k_1$ and $k_2$, thereby outputting multiplied image data ($k_1*S_1$) and ($K_2*S_2$). These image data ($k_1*S_1$) and ($K_2*S_2$) are input to the combination 42.

In the combination 42, the decision 604 determines whether or not the input image data ($k_1*S_1$) is above a threshold value $S_{SH}$ that is set in the correction 602 beforehand in consideration of a scatter. When the decision 604 determines that the image data ($k_1*S_1$) is below the threshold value $S_{SH}$, the selection 606 selects the image data ($k_1*S_1$) and delivers it to the signal processing 56 via its output 120. If the image data ($k_1*S_1$) is above the threshold value $S_{SH}$, the selection 606 selects the other image data ($k_2*S_2$) fed to its input 118 and delivers it to the signal processing 56 via the output 120. In this manner, the combination 42 selects image data on the basis of their values and combines them to produce combined image data. The combined image data, i.e., the image data ($k_1*S_1$) and ($k_2*S_2$) selected are delivered to the signal processing 56.

Figure 8:
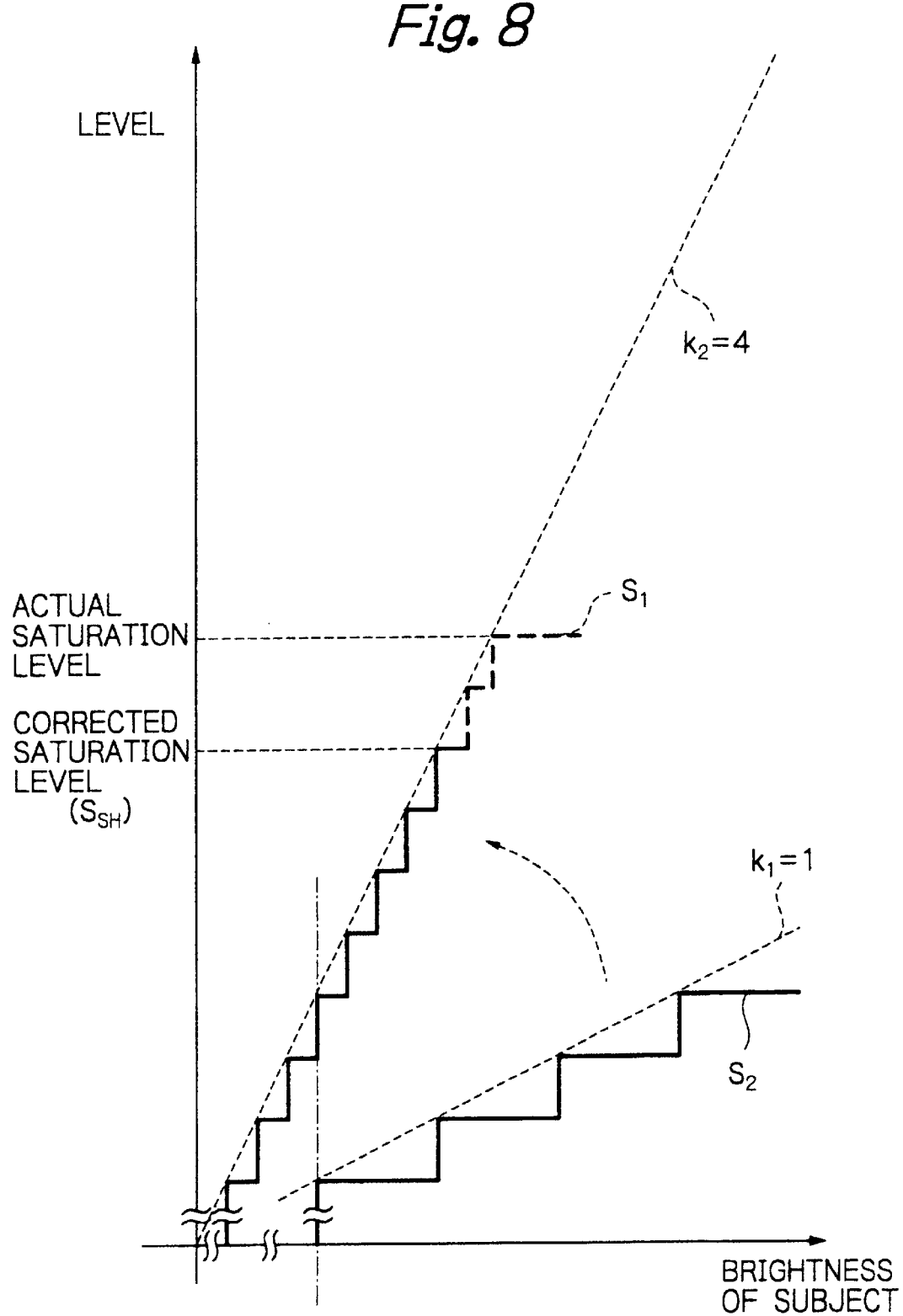
FIG. 8 is a graph showing a relation between the brightness of a subject and the signal level of image data particular to the illustrative embodiment.

As shown in FIG. 8, even when the image data ($S_1$) are picked up during the signal output period $S_1$ by adequate exposure, blocks reached the actual saturation level of the image sensor 16 are likely to exist, depending on the pattern and brightness of the scene. In light of this, the image data ($S_1$) are selected as image data below the saturation level corrected by the correction 602. As for image data above the corrected saturation level, among the multiplied image data $k_2*S_2$, the image data exceeding the corrected saturation level are selected. The image data so combined successfully achieve a broadened dynamic range.

Figure 9:
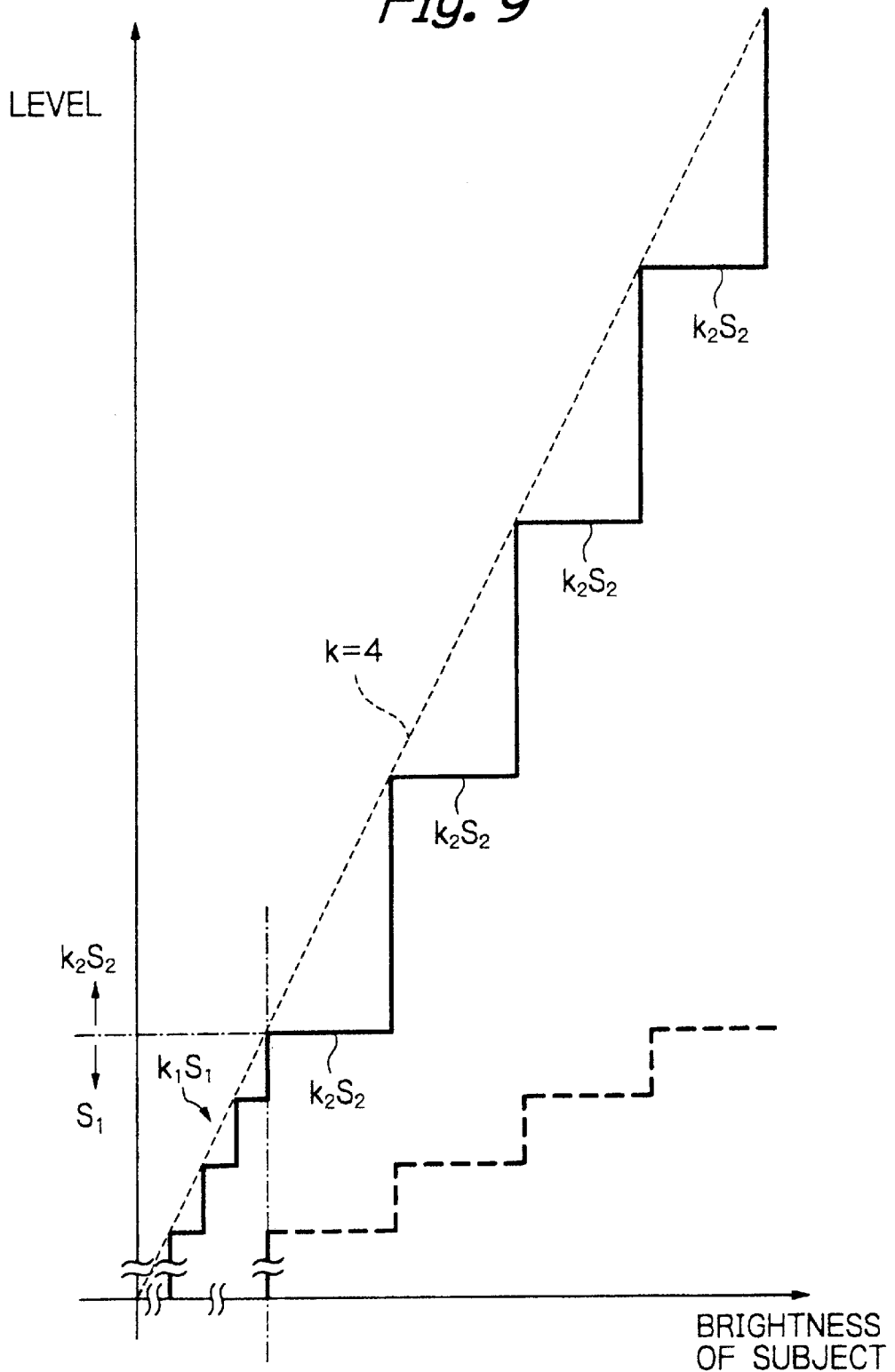
FIG. 9 is a graph showing a relation between the brightness of a subject and the signal level of combined image data particular to the illustrative embodiment.

More specifically as shown in FIG. 9, the image data ($S_1$) are selected when the signal level thereof is above the corrected saturation level, or the image data ($k_2S_2$) are selected when the signal level thereof is below the corrected saturation level. As shown in FIG. 8, the image data ($S_2$) do not saturate because exposure lower by several electron volts is assigned to the image data ($S_1$) beforehand. The saturated portions of the image data ($S_1$) are replaced with the image data ($k_2S_2$) corresponding to saturated highlight portions.

Figure 12:
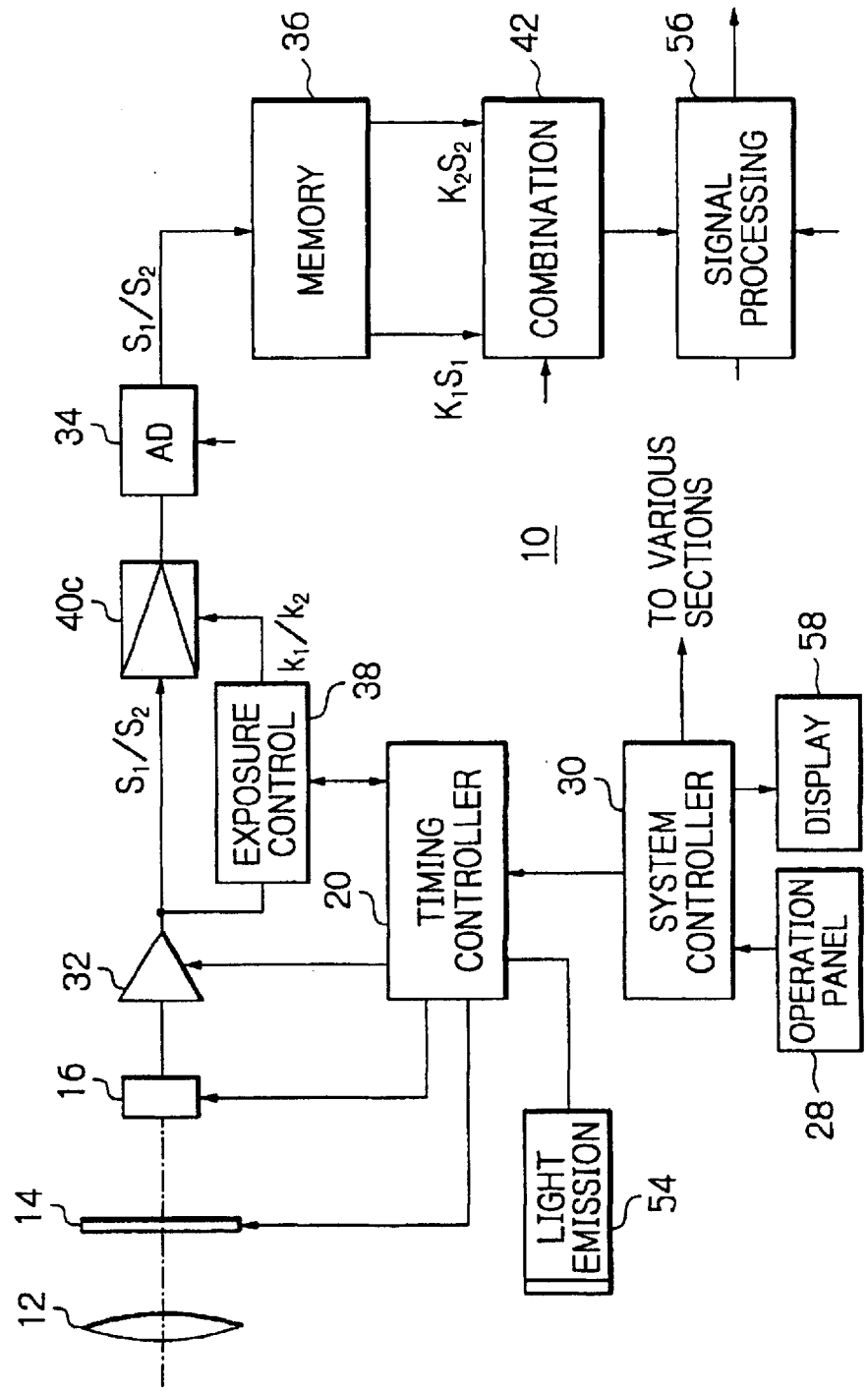
FIG. 12 is a schematic block diagram showing the alternative embodiment of the present invention.

Reference will be made to FIG. 12 for describing an alternative embodiment of the present invention. The previous embodiment corrects the levels of the image data ($S_1$) and ($S_2$), performs preselected calculations with the corrected image data, and combines the resulting image data. The alternative embodiment to be described hereinafter executes level correction at the analog image signal stage, digitizes corrected image signals, and combines the resulting digital image data. This embodiment is capable of dividing the steps for the combined high brightness portions more finely than the previous embodiment. In FIG. 12, structural elements identical with the structural elements shown in FIG. 2 are designated by identical reference numerals and will not described specifically in order to avoid redundancy.

As shown in FIG. 12, the illustrative embodiment includes a level correcting circuit 40c implemented by an analog amplifier having a variable gain. The level correcting circuit 40c selectively amplifies the input image signals with a gain corresponding to either one of the correction coefficients $k_1$ and $k_2$ fed from the exposure control 38. The ADC 34 digitizes the output of the level correcting circuit 40c. In this configuration, as shown in FIG. 13 specifically, the combination 42 selects image data ($S_{1L}$) at levels lower than the preselected saturation level $S_{SH}$, i.e., the actual saturation level of the image sensor 16. On the other hand, the combination 42 selects image data ($k_2S_{2H}$), which are the image data ($S_{2H}$) multiplied by the correction coefficient $k_2$, at levels higher than the saturation level $S_{SH}$. As FIG. 13 indicates, the consecutive steps are divided more finely than in the previous embodiment, further enhancing tonality in the high brightness portion.

If desired, the image signals output from the level correcting circuit 40c and then digitized by the ADC 34 may be input to the level correcting section 40, FIG. 2. This is successful to further enhance tonality in the high brightness portion and accurate level correction.

Conversely, the configuration shown in FIG. 2 may be so modified as to execute compression with a high brightness portion. Specifically, to digitize the image data ($S_2$) shown in FIG. 8, use may be made of a digitizing circuit different in input scale from the ADC or digitizing circuit 34 assigned to the image data ($S_1$). In such a case, particular resolution available with each digitizing circuit can be desirably used to output digital image data and combine them. This processing may be implemented by software, if desired.

Figure 1:
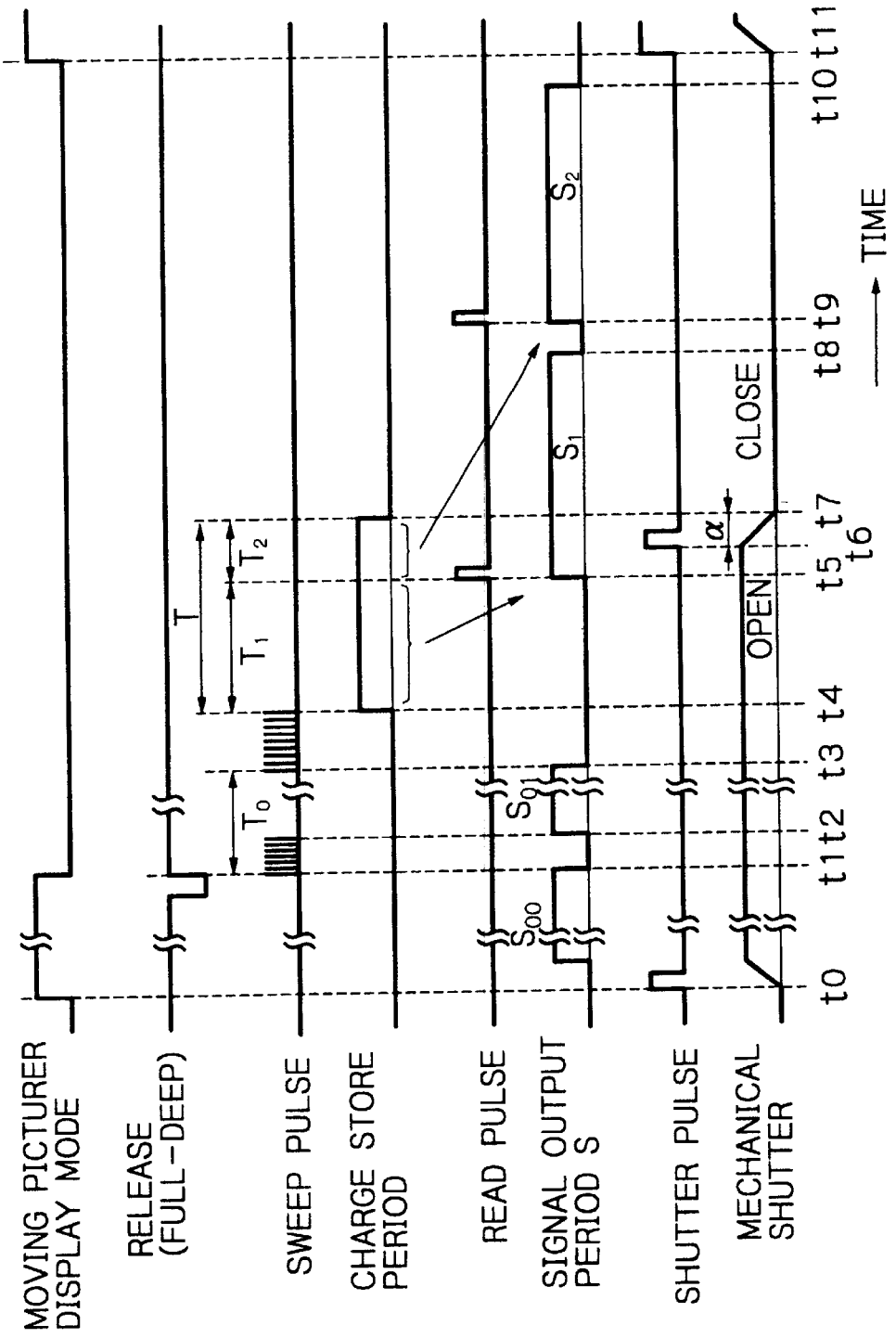
FIG. 1 is a timing chart demonstrating a specific operation of a digital still camera embodying the present invention.
Figure 11:
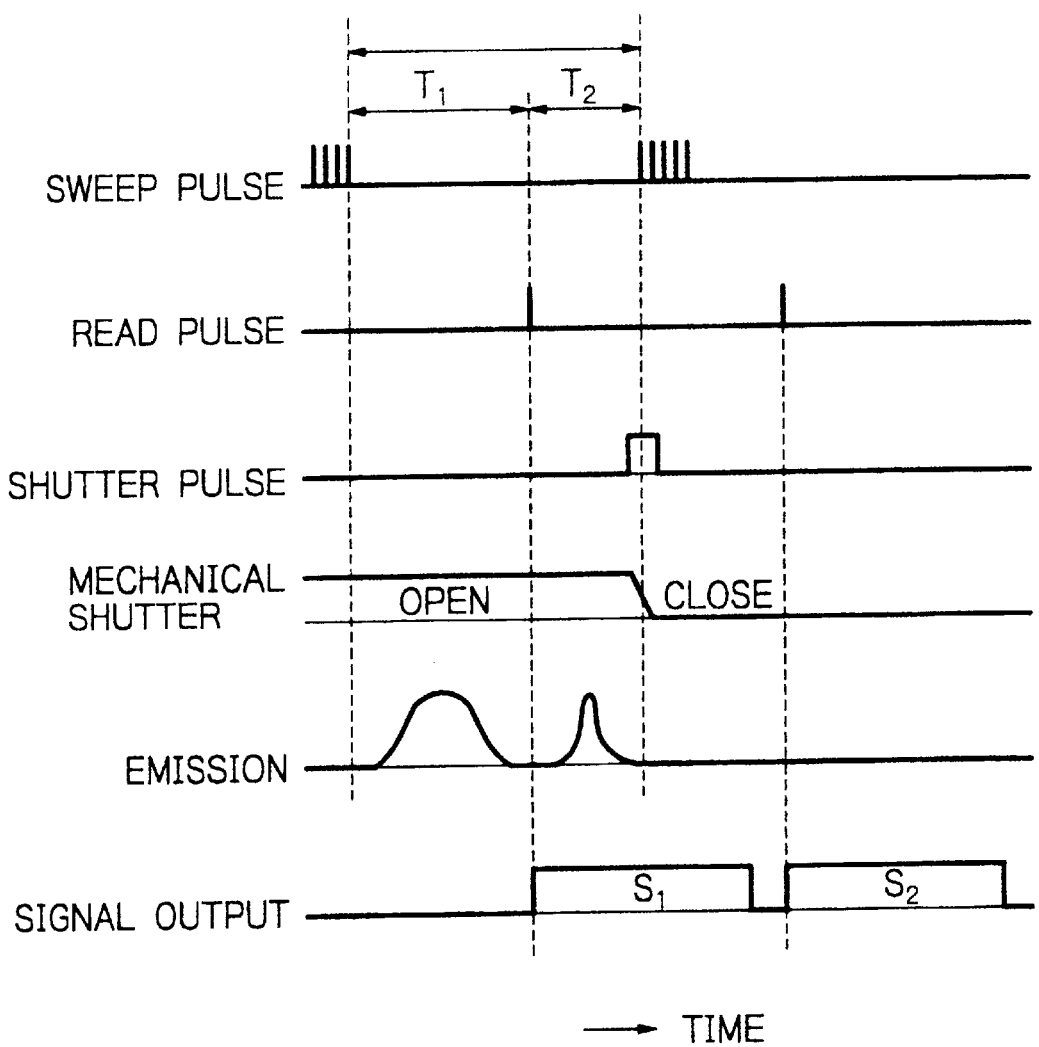
FIG. 11 is a timing chart representative of a specific operation of an alternative embodiment of the present invention.

FIG. 11 is a timing chart representative of another alternative embodiment of the present invention similar to the embodiment of FIGS. 1 and 2 except for the following. As shown, this embodiment, like the embodiment of FIGS. 1 and 2, picks up a scene over the exposure time T made up of the periods of time $T_1$ and $T_2$. This embodiment executes the following unique control over the emission of the light emission 54, FIG. 2.

When the light emission 54 is caused to emit light for illuminating a desired subject, the emission occurs during both of the periods of time $T_1$ and $T_2$. In the illustrative embodiment, the system controller 30 and timing controller 20 make the duration of emission assigned to the period of time $T_2$ shorter than the duration of emission assigned to the period of time $T_1$. Consequently, a particular quantity of light is emitted toward a subject in each of the periods of time $T_1$ and $T_2$ on the basis of the exposure ratio.

The image data ($S_1$) and ($S_2$) generated with the light emission 54 emitting light toward a subject two consecutive times are combined. In the illustrative embodiment, too, the image data ($S_1$) and ($S_2$) are combined on the basis of the exposure amount ratio of the non-saturated blocks. This insures accurate detection and therefore accurate correction of signal levels and thereby realizes accurate combination based on corrected image data. In addition, the duration and/or the quantity of emission is smaller during the period of time $T_2$ than during the period of time $T_1$, so that the influence of smears on the signal charges being transferred during the signal output period $S_1$ is reduced.

As for a shot using the light emission 54 illuminating a limited range, it is likely that a subject close to the light emission 54 is excessively exposed, depending on the distance between the light emission 54 and the subject and the set exposure. The illustrative embodiment determines an exposure amount ratio based on the actual image data and then combines image data in accordance with the determined ratio. Therefore, an image whose highlight portion has desirable tonality is achievable because of the broadened dynamic range. More specifically, when a conventional camera shoots, e.g., two persons respectively positioned at a short distance and a medium distance from the camera, brightness derived from light emission sometimes noticeably differs from one person to the other person; as for the person closer to the camera, saturation occurs. By contrast, the illustrative embodiment can use image data output over the period of time $T_2$ instead of the image data of the saturated portion, guaranteeing a highlight portion with tonality. In addition, an image represented by the processed image data can be easily retouched.

Because the illustrative embodiment reduces the quantity of the second emission from the light emission 54, the periods of times $T_1$ and $T_2$ constituting the exposure time T may be equal to each other, if desired. When the period of time $T_2$ is shorter than the period of time $T_1$, as in the illustrative embodiment, the light emission 54 should preferably be provided with a so-called FP emission capability for continuing the emission over the consecutive periods of time $T_1$ and $T_2$. In this manner, the light emission 54 may emit either one of flashlight and continuous light. Again, the lens opening may be varied in order to lower the quantity of light to be incident to the image sensor 16.

The illustrative embodiments shown and described each are constructed to combine the image data generated over the periods of time $T_1$ and $T_2$. Alternatively, when an arrangement is so made as to transfer signal charges more rapidly in the vertical and horizontal directions for thereby making the signal output period shorter than the exposure time, a longer exposure time T may be set that additionally includes a period of time $T_3$ shorter than or equal to the period of time $T_2$. In such a case, signal charges stored during the period of time $T_3$ will be read out in response to a third read pulse. This allows image data to be generated with a broader dynamic range as to a high brightness portion by combining the image data ($S_1$) and ($S_2$) and image data ($S_3$).

The illustrative embodiments not only broaden the dynamic range as to a high brightness portion, but also relatively improve the tonality of combined image data as to a low brightness portion, thereby implementing a dynamic range in which the saturation degree of the image sensor 16 is increased. This guarantees a desirable image even at the time of a high contrast shot, e.g., a picture taken against the light.

In summary, in accordance with the present invention, a first exposure value and a second exposure value effecting lower exposure than the first exposure value are set. An exposure time is made up of a first and a second period of time. Signal charges stored in photosensitive cells are shifted to transfer paths included in an image sensor at a timing corresponding to the first period of time. Subsequently, image pickup means outputs a first signal in order to intercept incident light and to end the second period of time following the first period of time. After a first signal has been fully output, a second signal corresponding to signal charges generated during the second period of time is output from the image sensor. This procedure reduces smears in the event of exposure effected during the second period of time and allows the second signal to desirably reproduce a high brightness portion.

Further, in accordance with the present invention, an exposure amount ratio between the first and second signals is calculated in order to correct the levels of the two signals on the basis of the calculated ratio. Subsequently, the two signals are combined to form an image signal representative of a single frame picked up during the exposure time. The signals are therefore accurately combined in accordance with the actual amount of exposure, so that the resulting image signal has an adequately broadened dynamic range. If signals derived from a non-saturated area are used to calculate the exposure amount ratio, a ratio different from a simple shutter speed ratio can be obtained, depending on the kind of an image, and an realize signal processing adequately matching with a pattern.

The entire disclosure of Japanese patent application No. 225962/1999 filed Aug. 10, 1999 including the specification, claims, accompanying drawings and abstract of the disclosure is incorporated herein by reference in its entirety.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. An image pickup apparatus for photoelectrically converting an optical image focused on photosensitive cells of an image sensor via a lens to thereby output image signals corresponding to said optical image, said apparatus comprising:

a shutter for intercepting, when an exposure time expires with the photosensitive cells generating signal charges, light incident to the image sensor;

a memory for storing the image signals output from the image sensor;

a controller for controlling an operation of said image pickup apparatus and determining an amount of exposure for picking up a scene in a form of a still picture; and a combining circuit for combining the image signals read out of said memory;

said controller comprising:

an exposure value determining circuit for determining a first exposure value based on the incident light and a second exposure value that effects lower exposure than said first exposure value;

an exposure control circuit for causing the optical image to be photoelectrically converted over the exposure time that consists of a first and a second period of time respectively corresponding to the first exposure value and the second exposure value;

a first read control circuit for causing, at a timing corresponding to the first period of time, signal charges generated by and stored in the photosensitive cells to be shifted to transfer paths of the image sensor, thereby causing said image sensor to output a first signal corresponding to said signal charges;

a light intercepting circuit for causing, at an end of the exposure time, said shutter to intercept the incident light to thereby end the second period of time following the first period of time;

a second read control circuit for causing, after said image sensor has output the first signal, said image sensor to output a second signal corresponding to signal charges generated by and stored in the photosensitive cells during the second period of time;

a ratio calculating circuit for calculating an exposure amount ratio between the first signal and the second signal; and a correcting circuit for correcting a level of the second signal in accordance with the exposure amount ratio;

said combining circuit combining image signals, which respectively correspond to the first signal and the second signal corrected by said correcting circuit, for thereby outputting an image signal representative of a single frame picked up during the exposure time.

2. An apparatus in accordance with claim 1, wherein said controller further comprises a coefficient calculating circuit for calculating a correction coefficient matching with the exposure amount ratio, wherein said correcting circuit corrects the level of the second signal by using said correction coefficient, and wherein said combining circuit selects and outputs either one of the first signal read out of said memory and the second signal corrected by said correcting circuit.

3. An apparatus in accordance with claim 1, wherein said controller further comprises an area selecting circuit for selecting a non-saturated area included in the first signal, and wherein said ratio calculating circuit produces a sum of a portion of the first signal corresponding to said non-saturated area and a sum of a portion of the second signal corresponding to said non-saturated area and then produces a ratio between said sums as the exposure amount ratio.

4. An apparatus in accordance with claim 2, wherein said coefficient calculating circuit comprises:
  a first calculating circuit for calculating a first correction coefficient for correcting the level of the first signal on the basis of level optimization information that is used to determine photometry conditions in accordance with the image signals output from the image sensor; and
  a second calculating circuit for calculating a second correction coefficient for correcting the level of the second signal in accordance with the exposure amount ratio and the first correction coefficient;
  said correcting circuit correcting the level of the first signal and the level of the second signal by using said first correction coefficient and said second correction coefficient, respectively;
  said combining circuit combining the first signal and the second signal corrected by said correcting circuit.

5. An apparatus in accordance with claim 1, wherein said ratio calculating circuit comprises:
  a block forming circuit for dividing each of the first signal and the second signal output from the image sensor into a plurality of blocks of data;
  an adding circuit for adding levels of each block of data to thereby output block-by-block sums with each of the first signal and the second signal;
  a decision circuit for determining, based on the block-by-block sums derived from the first signal, whether or not an individual block has saturated; and
  an area value calculating circuit for calculating, based on a result of decision output from said decision circuit, a total of the sums of a non-saturated area with each of the first signal and the second signal;
  said ratio calculating circuit calculating a ratio between totals output from said area value calculating circuit and respectively derived from the first signal and the second signal to thereby output the exposure amount ratio.

6. An apparatus in accordance with claim 5, wherein before the still picture is picked up, said block forming circuit divides the image signals output from the image sensor into the plurality of blocks, and wherein said exposure value determining circuit determines the first exposure value and the second exposure value on the basis of block-by-block data.

7. An apparatus in accordance with claim 1, further comprising a light emitting device for emitting light for illuminating a scene at the time of pickup of the still picture, said exposure control circuit causing said light emitting device to emit a quantity of light corresponding to the first exposure value during the first period of time and to emit a quantity of light corresponding to the second exposure value during the second period of time.

8. An image pickup control method of photoelectrically converting an optical image focused on photosensitive cells of an image sensor via a lens to thereby output image signals corresponding to said optical image, said method comprising:
  a light intercepting step of intercepting, when an exposure time expires with the photosensitive cells generating signal charges, light incident to the image sensor;
  a storing step of storing the image signals output from the image sensor;
  a controlling step of controlling an operation of said image pickup apparatus and determining an amount of exposure for picking up a scene in a form of a still picture; and
  a combining step of combining the image signals stored in said storing step;
  said controlling step comprising:
  an exposure value determining step of determining a first exposure value based on the incident light and a second exposure value that effects lower exposure than said first exposure value;
  an exposure controlling step of causing the optical image to be photoelectrically converted over the exposure time that consists of a first and a second period of time corresponding to the first exposure value and the second exposure value, respectively;
  a first read controlling step of causing, at a timing corresponding to the first period of time, signal charges generated by and stored in the photosensitive cells to be shifted to transfer paths of the image sensor, thereby causing said image sensor to output a first signal corresponding to said signal charges;
  a second read controlling step of causing, after the first signal has been output in said first read controlling step, the image sensor to output a second signal corresponding to signal charges generated by and stored in the photosensitive cells during the second period of time;
  a ratio calculating step of calculating an exposure amount ratio between the first signal and the second signal; and
  a correcting step of correcting a level of the second signal in accordance with the exposure amount ratio;
  in said combining step, image signals, which respectively correspond to the first signal and the second signal corrected in said correcting step, being combined for thereby outputting an image signal representative of a single frame picked up during the exposure time.

9. A method in accordance with claim 8, wherein said controlling step further comprises a coefficient calculating step of calculating a correction coefficient matching with the exposure amount ratio, wherein in said correcting step the level of the second signal is corrected by using said correction coefficient, and wherein in said combining step either one of the first signal stored in said storing step and the second signal corrected in said correcting step is selected and output.

10. A method in accordance with claim 8, wherein said controlling step further comprises an area selecting step of selecting a non-saturated area included in the first signal, and wherein in said ratio calculating step a sum of a portion of the first signal corresponding to said non-saturated area and a sum of a portion of the second signal corresponding to said non-saturated area is produced and then a ratio between said sums is produced as the exposure amount ratio.

11. A method in accordance with claim 9, wherein said coefficient calculating step comprises:
  a first calculating step of calculating a first correction coefficient for correcting the level of the first signal on the basis of level optimization information that is used to determine photometry conditions in accordance with the image signals output from the image sensor; and a second calculating step of calculating a second correction coefficient for correcting the level of the second signal in accordance with the exposure amount ratio and the first correction coefficient;

wherein in said correcting step, the level of the first signal and the level of the second signal are corrected by using said first correction coefficient and said second correction coefficient, respectively;

wherein in said combining step, the first signal and the second signal corrected by said correcting step are combined.

12. A method in accordance with claim 8, wherein said ratio calculating step comprises:

a block forming step of dividing each of the first signal and the second signal output from the image sensor into a plurality of blocks of data;

an adding step of adding levels of each block of data to thereby output block-by-block sums with each of the first signal and the second signal;

a deciding step of determining, based on the block-by-block sums derived from the first signal, whether or not an individual block has saturated; and an area value calculating step of calculating, based on a result of decision output in said deciding step, a total of the sums of a non-saturated area with each of the first signal and the second signal;

in said ratio calculating step a ratio between totals output in said area value calculating step and respectively derived from the first signal and the second signal is calculated to thereby output the exposure amount ratio.

13. A method in accordance with claim 12, wherein before the still picture is picked up, in said block forming step the image signals output from the image sensor are divided into the plurality of blocks, and wherein in said exposure value step determines the first exposure value and the second exposure value are determined on the basis of block-by-block data.

14. A method in accordance with claim 8, further comprising a light emitting step of emitting light for illuminating a scene at the time of pickup of the still picture, in said exposure controlling step said light emitting step being caused to emit a quantity of light corresponding to the first exposure value during the first period of time and to emit a quantity of light corresponding to the second exposure value during the second period of time.

* * * * *